United States Patent [19]

Nakata

[11] Patent Number: 5,532,933
[45] Date of Patent: Jul. 2, 1996

[54] CAD/CAM SYSTEM AND METHOD OF GENERATING MACHINING PATHS FOR THE SAME

[75] Inventor: Masafumi Nakata, Nagoya, Japan

[73] Assignee: Mitsubishi Denki Kabushiki Kaisha, Tokyo, Japan

[21] Appl. No.: 209,748

[22] Filed: Mar. 14, 1994

[30] Foreign Application Priority Data

Mar. 12, 1993 [JP] Japan .................................. 5-052105

[51] Int. Cl.$^6$ ................................................ G06F 19/00
[52] U.S. Cl. .............................. 364/474.24; 364/474.22; 364/474.26
[58] Field of Search ................................. 364/191, 182, 364/474.22, 474.23, 474.24, 474.25, 474.26

[56] References Cited

U.S. PATENT DOCUMENTS

| | | | |
|---|---|---|---|
| 5,251,145 | 10/1993 | Yamamoto et al. | 364/474.22 |
| 5,255,200 | 10/1993 | Torizawa et al. | 364/474.22 |
| 5,272,622 | 12/1993 | Mizukami et al. | 364/191 |
| 5,276,606 | 1/1994 | Mizukami et al. | 364/474.22 |

Primary Examiner—Paul P. Gordon
Assistant Examiner—Thomas E. Brown
Attorney, Agent, or Firm—Sughrue, Mion, Zinn, Macpeak & Seas; Richard C. Turner

[57] ABSTRACT

A CAD/CAM system comprises a removal shape extraction section for extracting removal shape data from the defined finish shape data and work shape data, and a machining step generation section for generating a machining step for each machining surface Z height of the removal shape extracted by the removal shape extraction section.

21 Claims, 22 Drawing Sheets

F I G. 1
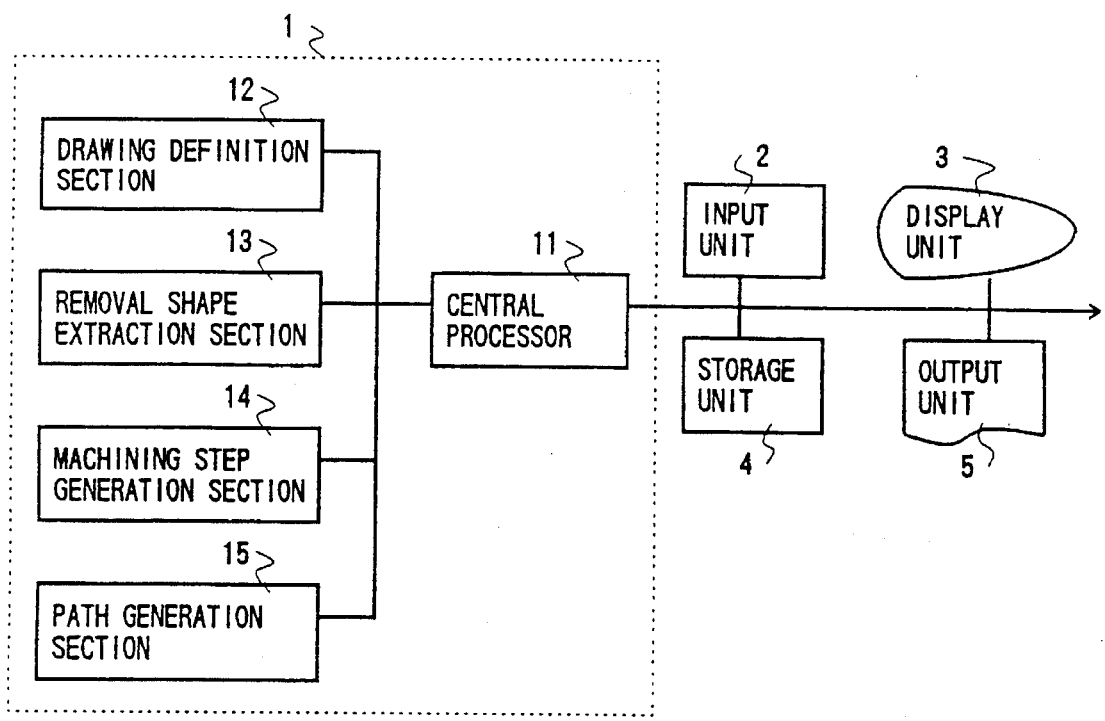

FIG. 22A
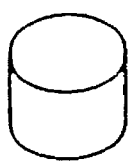
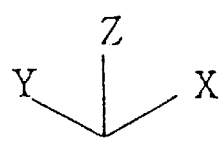
FIG. 22B
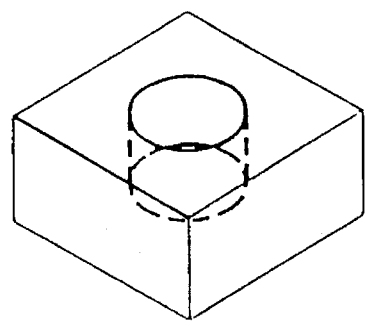
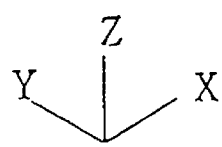
FIG. 22C
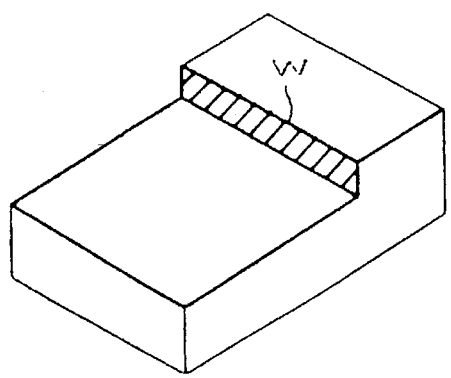
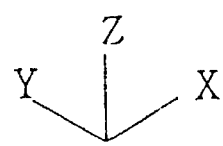

CAD/CAM SYSTEM AND METHOD OF GENERATING MACHINING PATHS FOR THE SAME

FIELD OF THE INVENTION

This invention relates to a CAD/CAM system and method of generating machining paths for generating machining paths (hereinafter referred to as "paths"). More particularly, the invention relates to a CAD/CAM system and method of generating machining paths which can generate paths of a machining center when a machine tool is moved in radial direction and Z direction to define a three-dimensional shape.

BACKGROUND OF THE INVENTION

FIG. 23 is a block diagram outlining a conventional CAD/CAM system. The system comprises a central processing unit (hereinafter referred to as CPU) 1a, which includes a central processor 11 for executing control operations for controlling the entire system, a drawing definition section 12 for defining drawings for removal shape generation, a removal shape definition section 13a for defining removal shapes for path generation, a machining step definition section 14a for defining machining conditions, such as the specifications for coarse and finish machining, cutting extent and feed speed of the tool, from defined removal shape data, and a path generation section 15 for generating paths according to defined machining step data. Also, included is an input unit 2 for inputting force data and command data to the CPU, a display unit 3 for graphically displaying drawing data, shape data and paths according to the results of operation in the CPU, a storage unit 4 for storing program data and results of operations in the CPU 1a, and an output unit 5 for outputting the contents displayed on the display unit 3 to a printer or the like.

Now, a method of obtaining a finish shape shown in FIG. 9A by generating paths shown in FIGS. 10A–10D to 12A–12C on a work shape shown in FIG. 9B with the conventional CAD/CAM system, will be described with reference to a drawing element status view of FIG. 13A, a curve status view of FIG. 13B, removal shape Z direction division status views of FIGS. 14A and 14B, removal shape status views of FIGS. 15A–15H, 16A–16H and to 17A–17F, initial hole removal shape status views of FIGS. 18A and 18B, a Z direction cut extent uniformization status view of FIG. 19, and a flow chart of FIG. 23. A longitudinal line area in FIGS. 15A–15H and FIGS. 18A and 18B show removed portions, a heavy line area in FIGS. 15A–15H and FIGS. 18A and 18B show finish shape portions.

First, with reference to FIGS. 13A, 13B and 23, lines a1 to a7 shown in FIG. 13A are defined by inputting commands for defining the lines a1 to a7 together with X-Y coordinates of end points t1 to t6 of the lines a1 to a7, X-Y coordinates of center points t7 and t8 of the lines a6 and a7 and radii r1 and r2 of the lines a6 and a7 from the input unit 2. Also, "curves" C0 to C4 shown in FIG. 13B are defined by inputting a command for extracting the curve C1 from the lines a1 to a4, a command for extracting the curve C2 from the lines a1, a2, a4 and a5, a command for extracting the curve C4 from the line a7 and a command for extracting the curve C0 from the lines a1 to a3 and a5 from the input unit 2 (step S51: drawing definition in FIG. 24).

Then, a removal shape V11 shown in FIG. 15A is defined by inputting a command for defining the removal shape V11 from the input unit 2. The command would be for performing machining from a machining surface height Z0 shown in FIG. 14A to the machining surface height Z1 plus Z direction finish margin Cz1, together with the machining surface height Z1 and Z direction finish margin Cz1. Also, like the removal shape V11, removal shapes V12 to V14 shown in FIGS. 15C–15H, shapes V21 to V24 shown in FIGS. 16A–16H and shape V31 to V33 shown in FIGS. 17A–17F are defined by inputting data of the curves C1 to C4, machining surface heights Z2 to Z4 and Z direction finish margins Cz2 t Cr3 (step S52: removal shape definition in FIG. 4).

Further, a machining step K11 shown in FIG. 21 is defined by inputting several lines from the input unit 2. The input are command for defining the machining step K11, a helical or parallel line machining pattern of path P11 shown in FIG. 10A generated for the removal shape V11, a radial direction cut extent Pr11 shown in FIG. 10A, a Z direction cut extent Pz1 and radial direction finish margin Cr1 shown in FIG. 19, a Z direction finish margin Cz1 shown in FIGS. 14A and 14B and a machining directions d11 of the path P11 shown in FIG. 10A.

Like the machining step K11, machining steps K12 to K14, K22 to K24 and K31 to K33 are defined by inputting machining patterns of paths P12 to P14 shown in FIGS. 10A–10D and paths P21 to P24 shown in FIGS. 11A–11D, radial direction cut extents Pr12 to Pr14 and Pr21 to Pr24, radial direction finish margins Cr2 and Cr3 and machining directions d12 and d13 shown in FIGS. 10A–10D and s22 to d24 shown in FIGS. 11A–11D.

With respect to the coarse machining removal shape V14 shown in FIG. 15G, a machining step K1 shown in FIG. 21 is further defined by inputting the X and Y coordinates of the machining position H1 of the initial hole removal shape I1 shown in FIGS. 18A and 18B, the machining surface height Z2 plus Z direction finish margin Cz3 shown in FIG. 15G as the machining surface height Z and the machining surface height Z2 plus Z direction finish margin Cz2 as the machining surface height Z (step S53: machining step definition).

Then, machining path generation commands for generating the paths P11 to P14, P21 to P24 and P31 to P33 from the machining steps K11, K12, K1, K13, K14, K21 to K24 and K31 to K33, defined in the step S4a, are input from the input unit 2 (step S54: machining path generation commanding).

The path generation section 15, receiving the above machining path generation commands, generates the path P11 for the machining step K11 according to the radial direction cut extent Pr11, Z direction cut extent Pz1 and machining direction d11, designated in the step S4a. Likewise, the section 15 successively generates the paths P12, P1, P13, P14, P21 to P24 and P31 to P33. When it has generated the paths up to the lowest surface Z height Z4, it ends the process (step S55: path generation).

With the conventional CAD/CAM system having the above construction, however, it is necessary to define the removal shape by dividing the work shape in the radial and Z directions for each machining step. In addition, it is necessary for each removal shape to input the radial and Z direction cutting extents and finish margins, helical, parallel line or like path pattern, machining direction data concerning the path, Z direction machining surface height and machining depth concerning the initial hole, and offset direction and offset amount of the removal shape contour curve. It is time-consuming to input the above shape data and machining data. In addition, the optimum input value determination and machining step design require skill and thus lead to inferior operation efficiency.

SUMMARY OF THE INVENTION

It is an object to provide a CAD/CAM system and a method of generating machining paths for the same, in which the work shape is divided according to defined work shape data and finish shape data for each of a plurality of machining surface Z heights, and removal shapes for machining path generation are automatically extracted by effecting a check as to the inclusion of machining surface in the radial direction, thus automatically generating a machining path for each removal shape and permitting operation efficiency improvement.

According to the invention, there is provided a CAD/CAM system, in which each machining path is defined continuously according to defined finish shape data, and which comprises removal shape extraction means for extracting removal shape data from the defined finish shape data and also from work shape data, and machining step generation means for generating each machining step for the Z height of the machining surface of reach removal shape extracted by the removal shape extraction means.

The removal shape extraction means includes Z direction division means for dividing the work shape in a Z height direction thereof for each machining surface Z height of the finish shape between the highest and lowest height Z heights in the Z height direction, and contour curve inclusion judgment means for specifying a removal shape for each machining surface Z height by judging whether the finish shape contour curve corresponding to the work shape after the division is included therein in the radial direction.

The machining step generation means includes machining direction determining means for determining a machining direction by removal shape division for each of coarse and finish machining steps, machining condition determining means for determining machining conditions such as cutting extents, feed speed and rpm of tool for each machining step, offset direction determining means for determining each finish shape contour curve offset direction for each machining step, offset amount determining means for determining the contour curve offset amount for each machining step, and initial hole determining means for determining the position of an initial hole in the machining step.

The Z direction division means includes extraction division means for extracting, in case of a curved finish shape, a horizontal portion of a curve representing a section of the removal shape, and dividing the removal shape in the Z height direction at the Z height of the horizontal portion.

The machining direction determining means includes determining means for effecting machining path direction determination such that if the finish shape contour corresponding to a machining step is pond-like, the machining path direction is along the finish shape contour, if the contour is island-like, the direction is parallel to the longitudinal direction of the contour, and if the contour has pond- and island-like portions, the direction is along the island-like portion of the contour.

The offset direction determining means includes determining means for automatically determining the offset direction such that if the finish shape contour corresponding to the work shape after division is pond-like, the offset direction of the contour is directed inwardly of the contour, if the contour is island-like, the offset direction is directed outwardly of said contour, and if the contour has both pond- and island-like portions, the offset direction is directed inwardly of the contour with respect to the pond-like portion and inwardly of the contour with respect to the island-like portion.

The offset amount determining means includes determining means for determining the amount of tool diameter offsetting of the finish shape contour for a machining step such that if the contour is pond-like, the offset amount is the sum of the tool diameter and the finish margin, if the contour is island-like, the offset amount is the difference between the tool diameter and an amount of protruding of the tool, and if the contour has pond- and island-like portions, the offset amount is the sum of the tool diameter and the finish margin with respect to the pond-like portion and the difference between the tool diameter and the amount of protruding of the tool with respect to the island-like portion.

The machining condition determining means determines the machining path pattern such that if the finish shape contour corresponding to the machining path is pond-like, the machining path is helical, if the contour is island-like, the pattern consists of parallel lines, and if the contour has pond- and island-like portions, the pattern continuously offsets the island-like portion.

The machining condition determining means includes first uniformizing means for uniformizing the Z direction cut extent in each machining step, and second uniformizing means for uniformizing the radial direction cut extent in each machining step.

The machining condition determining means includes setting means for calling machining conditions, such as the radial and Z direction cut extents, radial and Z direction feed speeds and rpm of tool, from an optimum machining condition data base registered for each tool according to the input tool name or tool identification No. and setting the called machining conditions for the pertinent machining step.

The initial hole determining means includes control means for generating an initial hole machining step if the finish shape contour corresponding to the machining step is pond-like and not generating any initial hole machining step if the contour has pond- and island-like portions.

According to the invention, there is also provided a method of generating machining paths for the CAD/CAM system, which comprises the steps of executing drawing definition by executing drawing definition, curve definition, finish shape definition and work shape definition, executing shape extraction by executing shape division in the Z direction and contour curve inclusion check for each removal shape, executing machining step generation by executing machining direction determination, machining condition determination and initial hole determination, and subsequently executing machining path generation.

In the removal shape extraction means according to the invention, the Z direction division means divides the work shape in a Z height direction thereof for each machining surface Z height of the finish shape between the highest and lowest Z heights in the Z height direction, and the contour curve inclusion judgment means judges for each machining surface Z height whether the finish shape contour curve corresponding to the work shape after the division is included therein in the radial direction.

In the machining step generation means according to the invention, the machining direction determination means a machining direction by effecting removal shape division for each of coarse and finish machining steps, the machining condition determining means determines machining conditions such as cut extents, feed speeds and rpm of tool for each machining step, offset direction determining means determines each finish shape contour curve offset direction for each machining step, the offset amount determining means determines the contour curve offset amount for each machining step, and the initial hole determining means determines the position of the initial hole in the machining step.

In the Z direction division means according to the invention, the extraction division means extracts, in case of a curved finish shape, a horizontal portion in a curve representing a section of the pertinent removal shape, and divides the removal shape in the Z height direction at the Z height of the horizontal portion.

The machining direction determining means according to the invention effects machining path direction determination such that if the finish shape contour corresponding to a machining step is pond-like, the machining path direction is along the finish shape contour, if the contour is island-like, the direction is parallel to the longitudinal direction of the contour, and if the contour has island-like with wall, the direction is along the pond-like portion of the contour.

The offset direction determining means according to the invention automatically determines the offset direction such that if the finish shape contour corresponding to the work shape after the division is pond-like, the offset direction of the contour is directed inwardly of the contour, if the contour is island-like, the offset direction is directed outwardly of the contour, and if the contour has island-like with wall, the offset direction is directed inwardly of the contour with respect to the pond-like portion and outwardly of the contour with respect to the island-like portion.

The offset amount determining means according to the invention determines the amount of tool diameter offsetting of the finish shape contour for a machining step such that if the contour is pond-like, the offset amount is the sum of the tool diameter and the finish margin, if the contour is island-like, the offset amount is the difference between the tool diameter and an amount of protruding of the tool, and if the contour has island-like with wall, the offset amount is the sum of the tool diameter and the finish margin with respect to the pond-like portion and is the difference between the tool diameter and the amount of protruding of the tool with respect to the island-like portion.

The machining condition determining means according to the invention determines the machining path pattern such that if the finish shape contour corresponding to a machining path is pond-like, the machining path pattern is helical, if the contour is island-like, the pattern consists of parallel lines, and if the contour has island-like with wall, the pattern continuously offset for the island-like portion.

The machining condition determining means also uniformizes the Z direction cut extent in each machining step and also uniformizes the radial direction cut extent in each machining step.

The machining condition determining means further calls machining conditions, such as the radial and Z direction cut extents, radial and Z direction feed speeds and rpm of tool, from an optimum machining condition data base registered for each tool according to the input tool name or tool identification No. and sets the called machining conditions for the pertinent machining step.

The initial hole determining means according to the inventions generates an initial hole machining step if the finish shape contour corresponding to the machining step is pond-like and does not generate any initial hole machining step if the contour has pond- and island-like portions.

As has been described in the foregoing, according to the invention removal shapes are generated automatically through division of a given work shape at finish surface Z heights of the finish shape. Thus, it is possible to dispense with an operation of inputting the removal shapes, which is cumbersome and constitutes double operation with respect to the finish shape input. In addition, the patterns and directions of paths are automatically determined from the generated removal shapes, and also optimum machining conditions are determined automatically from machining condition data bases. Thus, it is possible to permit easy determination of the patterns and directions of paths as well as machining conditions without need of any skill unlike the conventional operation of this type.

Further, with the removal shape extraction means according to the invention, the Z direction division means divides the work shape in the Z height direction at each machining surface Z height between the top and bottom H heights, and the contour curve inclusion judgment means specifies the removal shape by checking the radial direction inclusion of the finish shape contour curve corresponding to the work shape after the division. Thus, it is possible to dispense with the cumbersome operation of inputting removal shape obtained by dividing the work shape.

Further, with the machining step generation means according to the invention, the machining direction determining means determines the machining direction by dividing the removal shape for each of coarse and finish machining steps. Thus, it is possible to save the labor of the operation of dividing the removal shape for each of the coarse and finish machining steps. In addition, the machining condition determining means determines machining conditions such as the cut extent, feed speed and rpm of tool for each machining step. Thus, it is possible to determine the machining conditions without need of skill. Further, the offset direction determining means determines the offset direction of the finish shape contour curve for each machining step, while the offset amount determining means determines the offset amount with respect to the curve for each machining step. It is thus possible to save the labor of inputting the offset direction and offset amount with respect to a curve. Further, the initial hole determining means automatically determines the initial hole position in the machining step. It is thus possible to case the labor of calculating and inputting the initial hole machining surface H height as the initial hole machining position.

Further, with the Z direction division means according to the invention, in case of a curved finish surface a horizontal portion in a curve representing a section of the removal shape is extracted, and the removal shape is divided in the Z height direction at the Z height of the horizontal portion. It is thus possible to dispense with the cumbersome operation of dividing a curved removal shape in the Z height direction for each horizontal portion of the curve representing a section of the removal shape.

Further, with the machining direction determining means according to the invention, if the finish shape contour corresponding to each machining step is pond-like, the direction of the machining path is determined to be along the contour, if the contour is island-like, the direction is determined to be parallel in the longitudinal direction of the contour, and if the contour has pond- and island-like portions, the direction is determined to be along the island-like portion of the contour. It is thus possible to save the labor of determining and inputting the machining direction by judging the character or feature of the finish shape as to whether the shape is pond- and/or island-like.

Further, the offset direction determining means according to the invention automatically determines the offset direction for the finish shape contour corresponding to the work shape after the division such that if the contour is pond-like, the offset direction is inwardly of the contour, if the contour is island-like, the offset direction is outwardly of the contour, and if the contour has pond- and island-like portions, the offset direction is inwardly of the contour with respect to the pond-like portion and outwardly of the contour with respect to the island-like portion. It is thus possible to save the labor of determining and inputting the offset direction by judging the character or feature of the finish shape as to whether the shape is pond- and/or island-like.

Further, with the offset amount determining means according to the invention, to tool diameter offset the finish shape contour in each machining step, if the contour is pond-like, the offset amount is set to be the sum of the tool diameter and the finish margin, if the contour is island-like, the offset amount is set to be the difference between the protruding extent of the tool and the tool diameter, and if the contour has pond- and island-like portions, the offset amount is set to the sum of the tool diameter and the finish margin for the pond-like portion and the difference between the protruding extent of the tool and the tool diameter for the island-like portion. It is thus possible to save the labor of determining an inputting the offset amount by judging the character or feature of the finish shape as to whether the shape is pond- and/or island-like.

Further, the machining condition determining means according to the invention determines the machining path pattern such that if the finish shape contour in each machining step is pond-like, the pattern is helical, if the contour is island-like, the pattern consists of parallel lines, and if the contour has pond- and island-like portions, the pattern is one obtained by continuously offsetting the island-like portion. It is thus possible to save the labor of determining and inputting the machining path pattern by judging the character or feature of the finish shape as to whether the shape is pond- and/or island-like.

Further, with the machining condition determining means according to the invention the radial and Z direction cut extents are uniformized for each machining step. It is thus possible to dispense with the cumbersome operation inputting values of uniformized radial and Z direction cut extents.

Further, with the machining condition determining means according to the invention machining conditions such as radial and Z direction cut extents, radial and Z direction feed speeds, rpm of tool, are called from the optimum machining condition data base registered for each tool according to the input tool name or tool identification No. and are set for the machining step. It is thus possible to simplify the cumbersome operation of skillfully determining and inputting the machining conditions such as the Z direction cut extent, radial and Z direction feed speeds and rpm of the tool from the tool used for the machining.

Further, with the initial hole determining means according to the invention an initial hole machining step is generated if the finish shape contour in the machining step is pond-like and is not generated if the contour is island-like or has pond- and island-like portions. It is thus possible to save the labor of determining and inputting data as to whether the initial hole machining step is to be generated by judging the character or feature of the finish shape as to whether the shape is pond- and/or island-like.

Other objects and features of this invention will become understood from the following description with reference to the accompanying drawings.

BRIEF DESCRIPTION OF THE DRAWINGS

FIG. 1 is a block diagram outlining the CAD/CAM system according to the invention;

FIGS. 22A–22C show views for explaining definition of island-like and pond-like;

DESCRIPTION OF THE PREFERRED EMBODIMENTS

Figure 2:
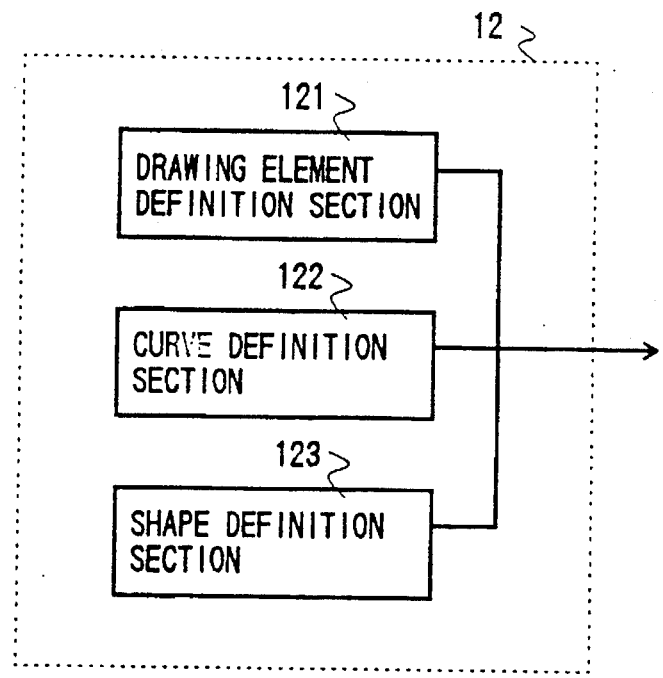
FIG. 2 is a block diagram outlining a drawing definition section shown in FIG. 1.

A first embodiment of the invention may be described. FIG. 1 is a block diagram outlining the embodiment of the CAD/CAM system. The illustrated CAD/CAM system Comprises a CPU 1, which includes a central processor 11 for executing operations of controlling the entire system, a drawing definition section 12 for defining drawings for removal shape generation, a removal shape extraction section 13 for generating removal shapes for path generation, a machining step generation section 14 for designating coarse and finish machining, tool and machining conditions such as cut extents, feed speeds and rpm of the tool according to generated removal shape data and optimum machining condition data base, and a path generation section 15 for generating paths according to generated machining steps. The system also comprises an input unit 2 for inputting drawing element data, shape data and other input data and also path generation command data and other command data to the CPU 1, a display unit 3 for graphically displaying drawing element data, shape data and paths based on the results of operations in the CPU 1, a storage unit 4 for storing operation program data and operation results in the CPU 1, and an output unit 5 for outputting the contents displayed on the display unit to a printer or the like.

The term "pond-like" and "island-like" are defined as follows. Namely, a form with a top surface finished as shown in FIG. 22A is defined as "island-like" form, a form with a bottom face finished as shown in FIG. 22B is defined as "pond-like" form, and furthermore a form with a top face finished as shown in FIG. 22C, in which a portion of the contour is a wall as shown in the shadowed section w, is defined as island-like with wall.

Figure 3:
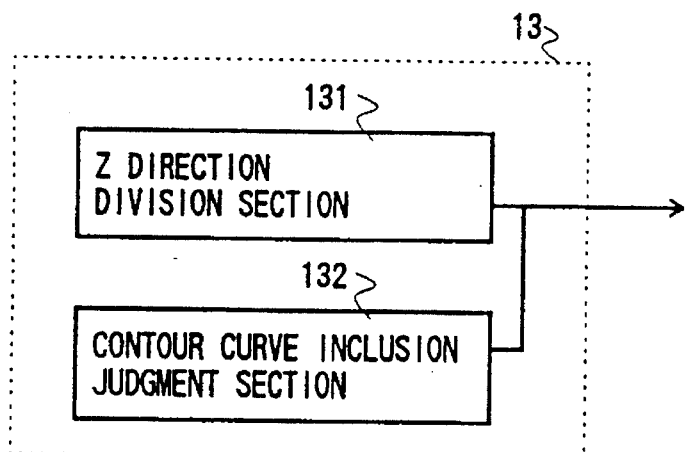
FIG. 3 is a block diagram outlining a removal shape extraction section.
Figure 4:
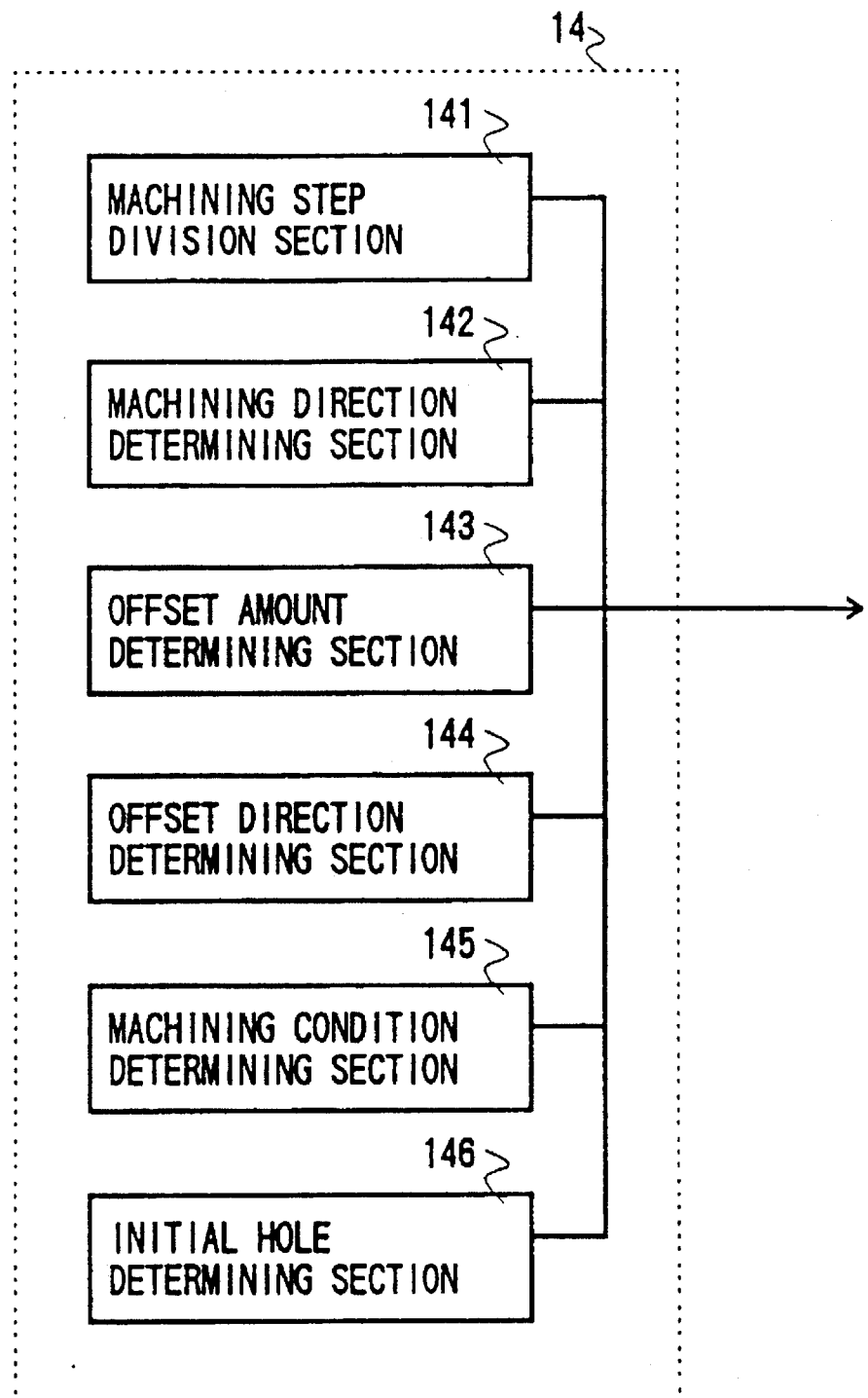
FIG. 4 is a block diagram outlining a machining step generation section shown in FIG. 1.

FIG. 2 is a block diagram outlining the drawing definition section 12. The section 12 includes a drawing element definition section 121, a curve definition section 122, and a shape definition section 123. FIG. 3 is a block diagram outlining the removal shape extraction section 13. The section 13 comprises a Z direction division section 131 and a contour curve inclusion judgment section 132. FIG. 4 is a block diagram outlining the machining step generation section 14. The section 14 includes a machining step division section 141, a machining step direction determination section 142, an offset amount determination section 143, an offset direction determination section 144, a machining condition determination section 145 and an initial hole determination section 146.

Figure 19:
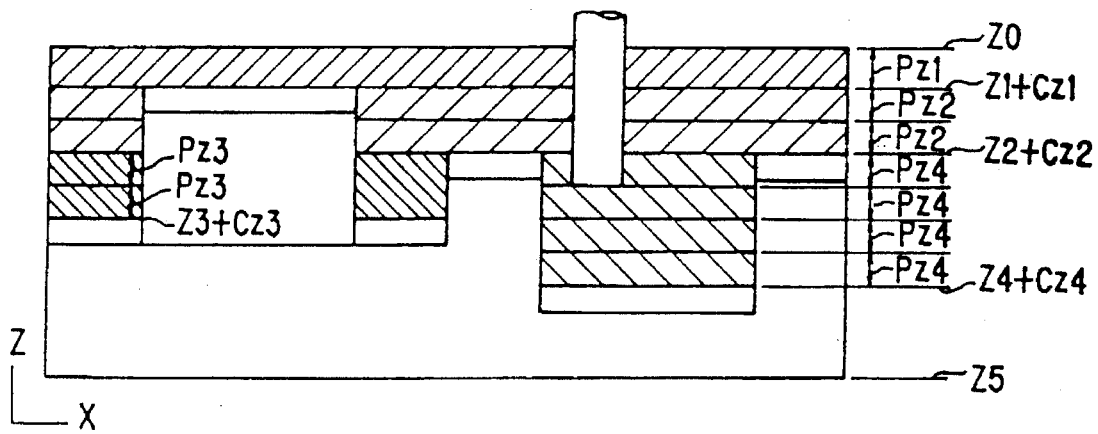
FIG. 19 is view for explaining uniformization of the cut extent in Z direction of path according to the invention.

Now, the operation of the embodiment having the above construction will be described in connection with a method of obtaining a finish shape shown in FIG. 9A by generating paths shown in FIGS. 10A–10D to 12A–12C with reference to the drawing element status view of FIG. 13A, curve status view of FIG. 13B, the removal shape Z direction division status view of FIG. 14A, removal shape status views of FIGS. 15A–15H to 17A–17H, Z direction cut extent uniformization status shown in FIG. 19 and flow charts of FIGS. 5 to 8.

Figure 13A:
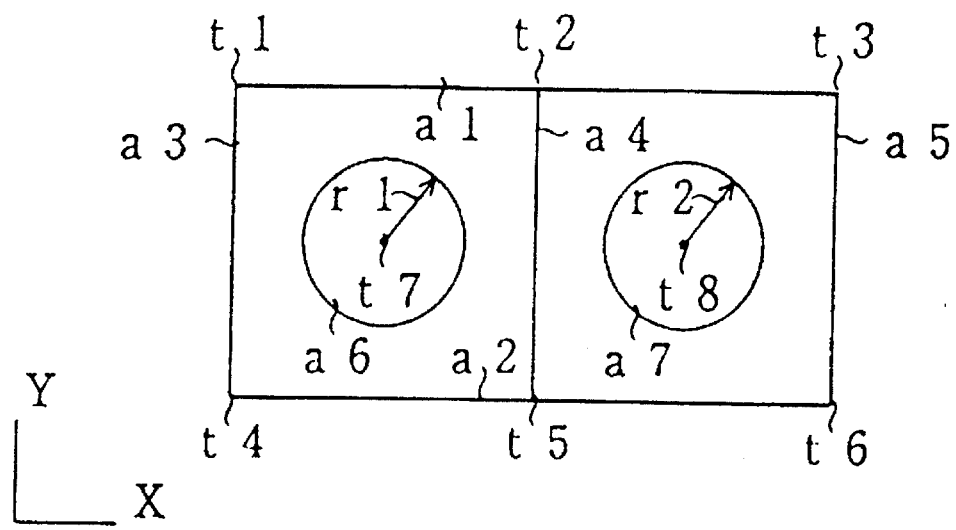
FIGS. 13A and 13B show views of drawing elements and curves for generating a finish shape and a work shape as a subject of the path generation according to the invention.

First, commands for defining the two dimensional drawings of the finish shape are input (step S1 in FIG. 5) as lines a1 to a7 shown in FIG. 13A, X-Y coordinates (i.e., horizontal coordinates) of the end points t1 to t6 of the lines a1 to a5, X-Y coordinates of the center points of the lines a6 and a7 and the radii r1 and r2 of the lines and a7. These are input from the input unit 2 to the lines element definition section 12 to cause the central processor to generate the lines a1 to a7 and store the generated lines a1 to a7 in the storage unit 4 (step S11: drawing definition of FIG. 6).

Figure 13B:
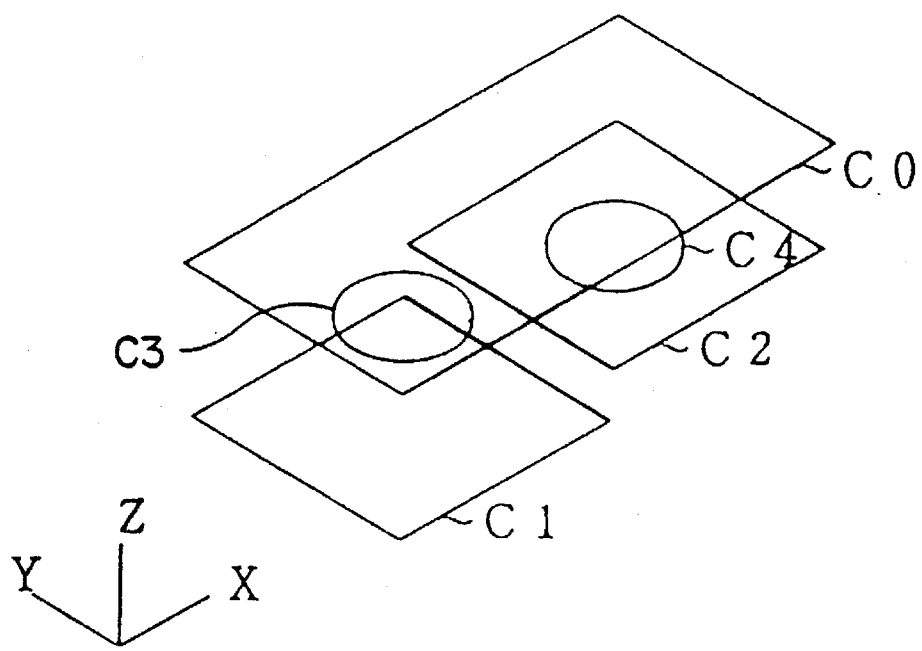

Then, a command for extracting a curve shown in FIG. 13B from the lines a1 to a4, a command for extracting a curve C2 from the lines a1 to a4, a command for extracting a curve C4 from the line a7 and a command for extracting a curve C0 from the lines a1 to a3 and a5 are input from the input unit 2 to the curve definition section 12a to cause the central processor 11 to generate the curves C0 to C4 and store the generated curves C0 to C4 in the storage unit 4 (step S12: curve definition).

Figure 9A:
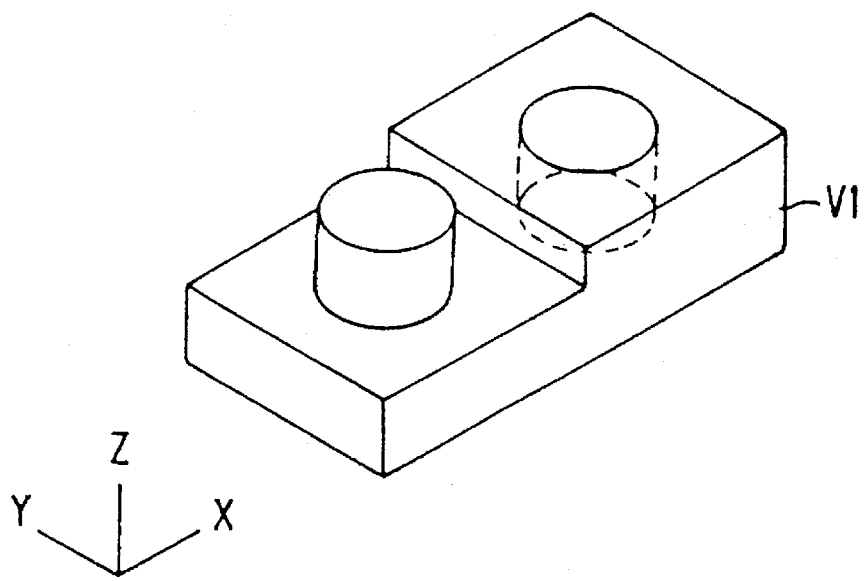
FIGS. 9A and 9B show views of a finish shape and a work shape as a subject of path generation according to the invention.
Figure 14A:
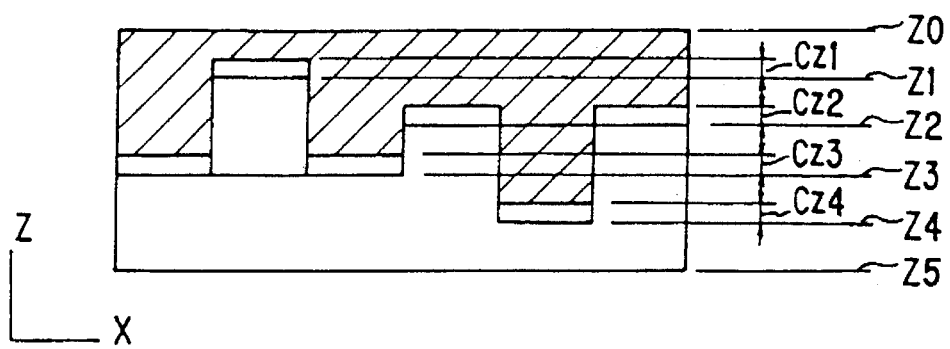
FIGS. 14A and 14B show views for explaining Z direction division of removal shape according to the invention.
Figure 14B:
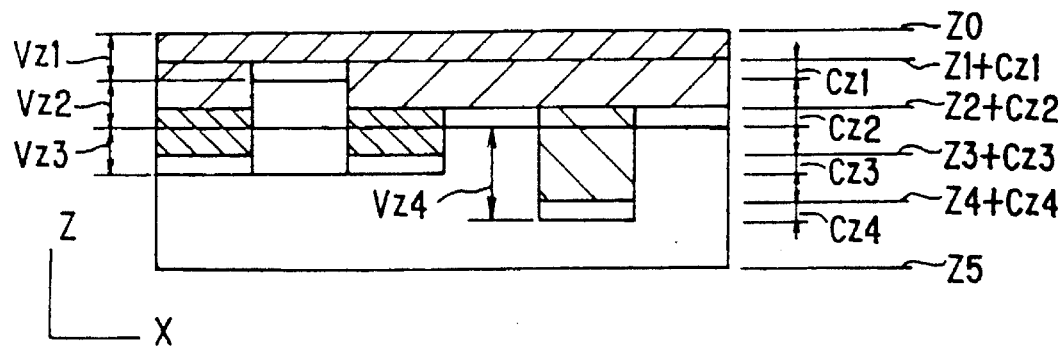

Further, with respect to the Z direction (i.e., vertical direction) shown in FIGS. 14A and 14B, the top and bottom Z heights (vertical coordinates) Z3 and Z5 of the curve C1, the top and bottom Z heights Z2 and Z5 of the curve C2, the top and bottom Z heights Z1 and Z3 of the curve C3, the top and bottom Z heights of Z1 and Z3 of the curve C3, and the top and bottom heights Z2 and Z4 of the curve C4 are input together with island-like-characteristic data indicating that the finish shape defined by the curves C1 to C3 is island-like and pond-like-characteristic data indicating that the finish shape defined by the curve C4 is pond-like from the input unit 2 to the shape definition section 123 to cause the central processor 11 to generate the finish shape V1 shown in FIG. 9A and store the generated finish shape V1 in the storage unit 4 (step S13: finish shape definition).

Figure 9B:
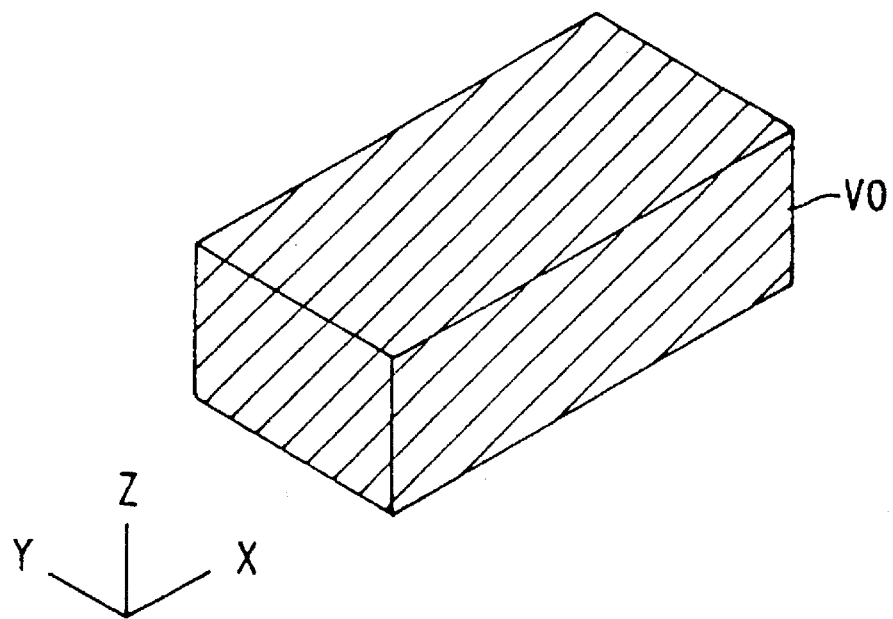

Further, with respect to the Z direction in FIG. 14A, the top and bottom Z heights Z0 and Z5 of the curve C0 are input from the input unit 2 to the shape definition section 123 to cause the central processor 11 to generate the work shape V0 shown in FIG. 9B and store the generated work shape V0 in the storage unit 4 (step S14: work shape definition). Through the steps S11 to S14, drawing definition is completed (step S1: drawing definition in FIG. 5).

Figure 5:
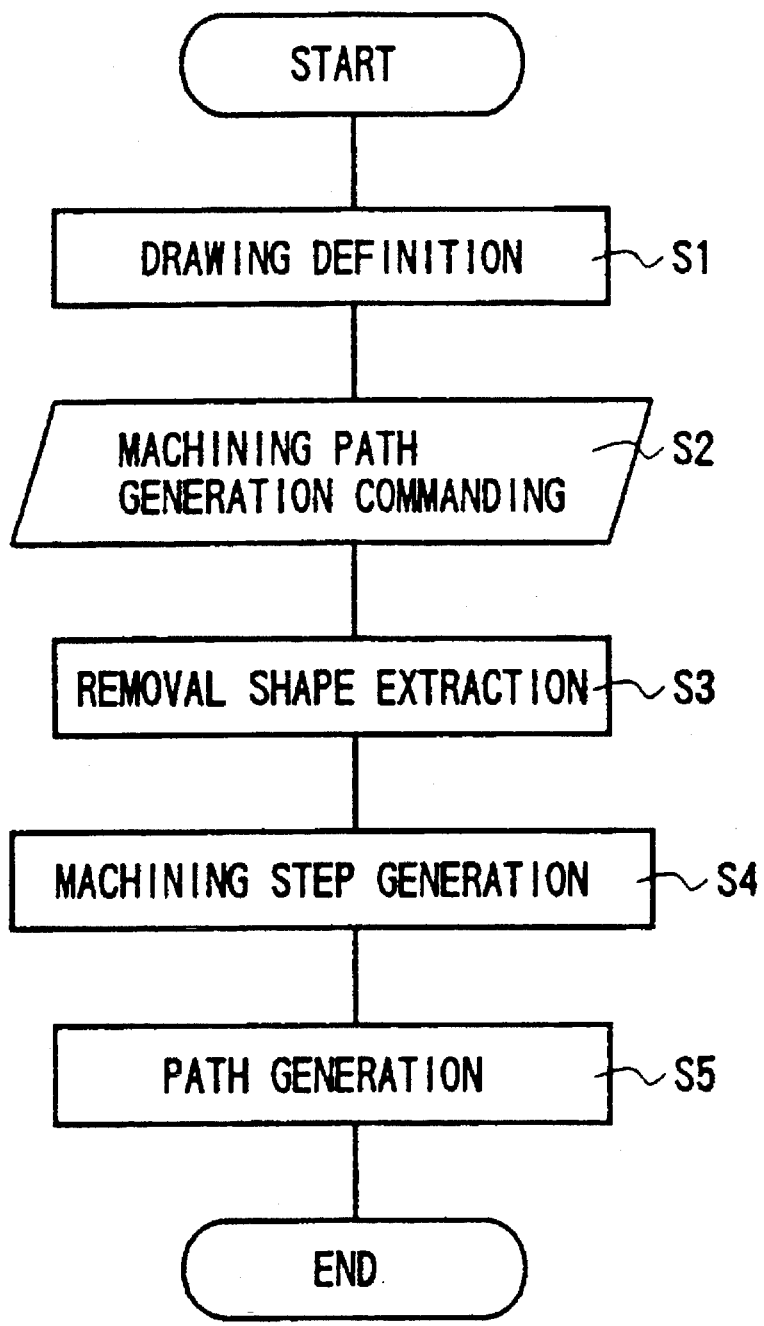
FIG. 5 is a flow chart showing the flow of operation of the entire system.
Figure 6:
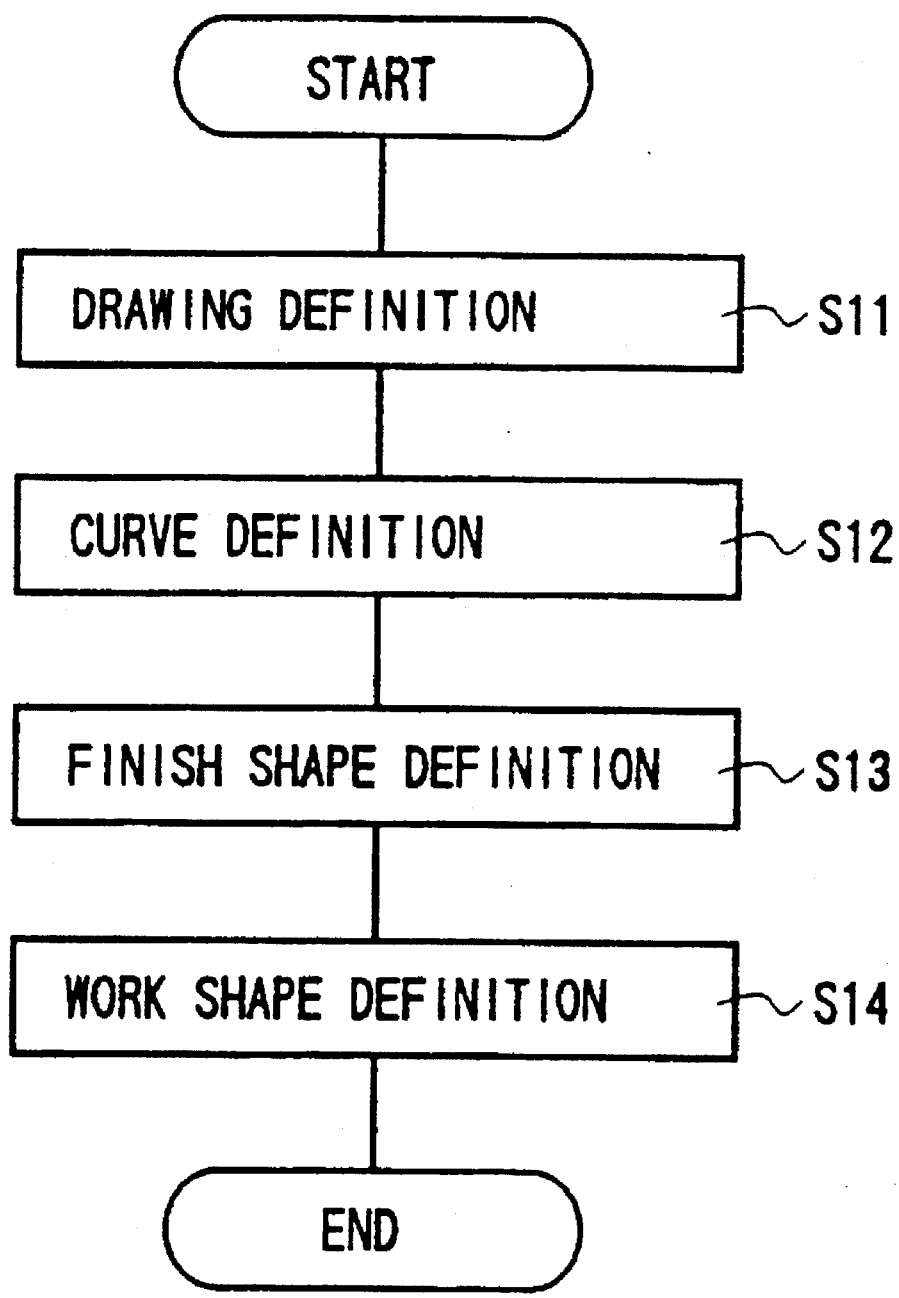
FIG. 6 is a flow chart showing the flow of operation in step S1 shown in FIG. 5.
Figure 7:
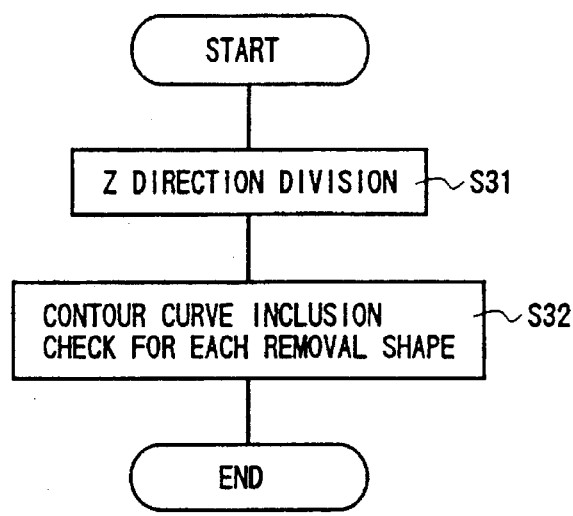
FIG. 7 is a flow chart showing the flow of operation in step S3 shown in FIG. 5.
Figure 8:
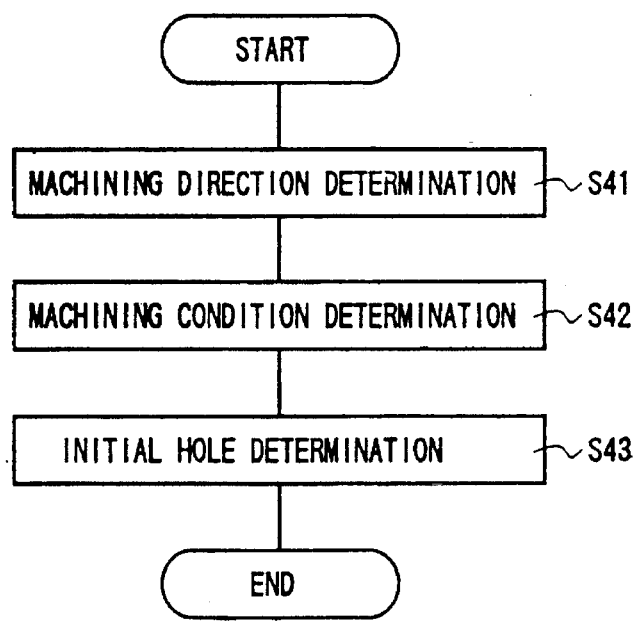
FIG. 8 is a flow chart showing the flow of operation in FIG. 5.

Subsequently, a path generation command and a command designating the work and finish shapes V0 and V1 shown in FIGS. 9A and 9B as a subject of machining are input together with the tool name or tool identification No. for each of coarse and finish machining purposes from the input unit 2 and restored in the storage Unit 4 (step S2: machining path generation command input in FIG. 5).

According to the above path generation commands stored in the storage unit 4, the central processor 11 causes the removal shape extraction section 13 to divide the work shape V0 in the Z direction as shown in FIG. 14B at Z direction machining surface heights Z1 to Z4 of the finish shape V1 between the Z direction top and bottom surface heights Z0 and Z5 shown in FIG. 14A and then judge whether the curve C0 shown in FIGS. 13A and 13B representing the contour of the work shape V0 and the curves C1 to C4 shown in the same Figure representing the contour of the finish shape V1 are included at the Z direction machining surface heights Z1 to Z4. Thus, removal shape specification in the radial direction of the tool is made, and the specified removal shape data is stored in the storage unit 4 (step S3: removal shape extraction in FIG. 5).

Figure 18A:
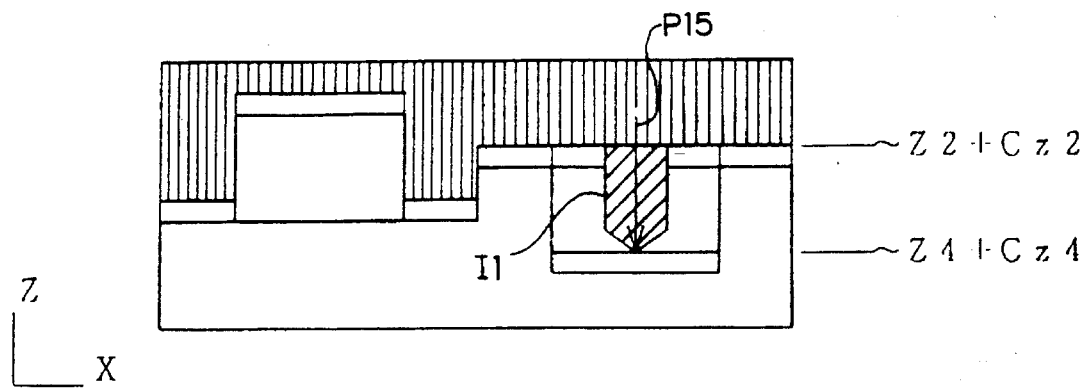
FIGS. 18A and 18B show views for explaining initial hole removal shape as a subject of the path generation according to the invention.
Figure 18B:
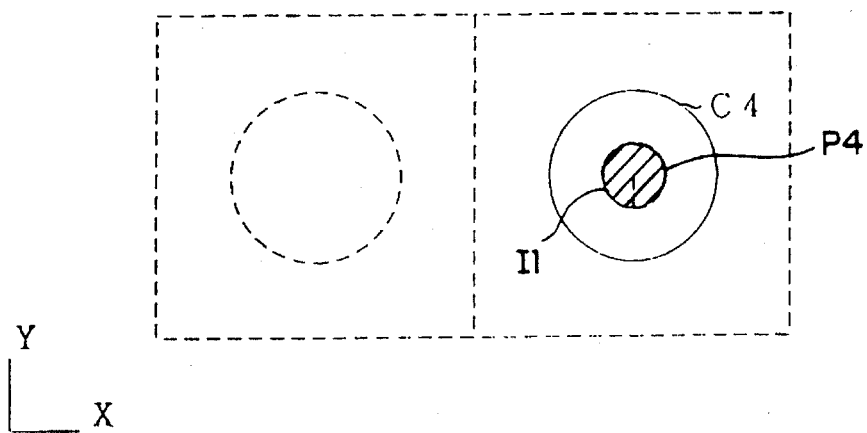
Figure 21:
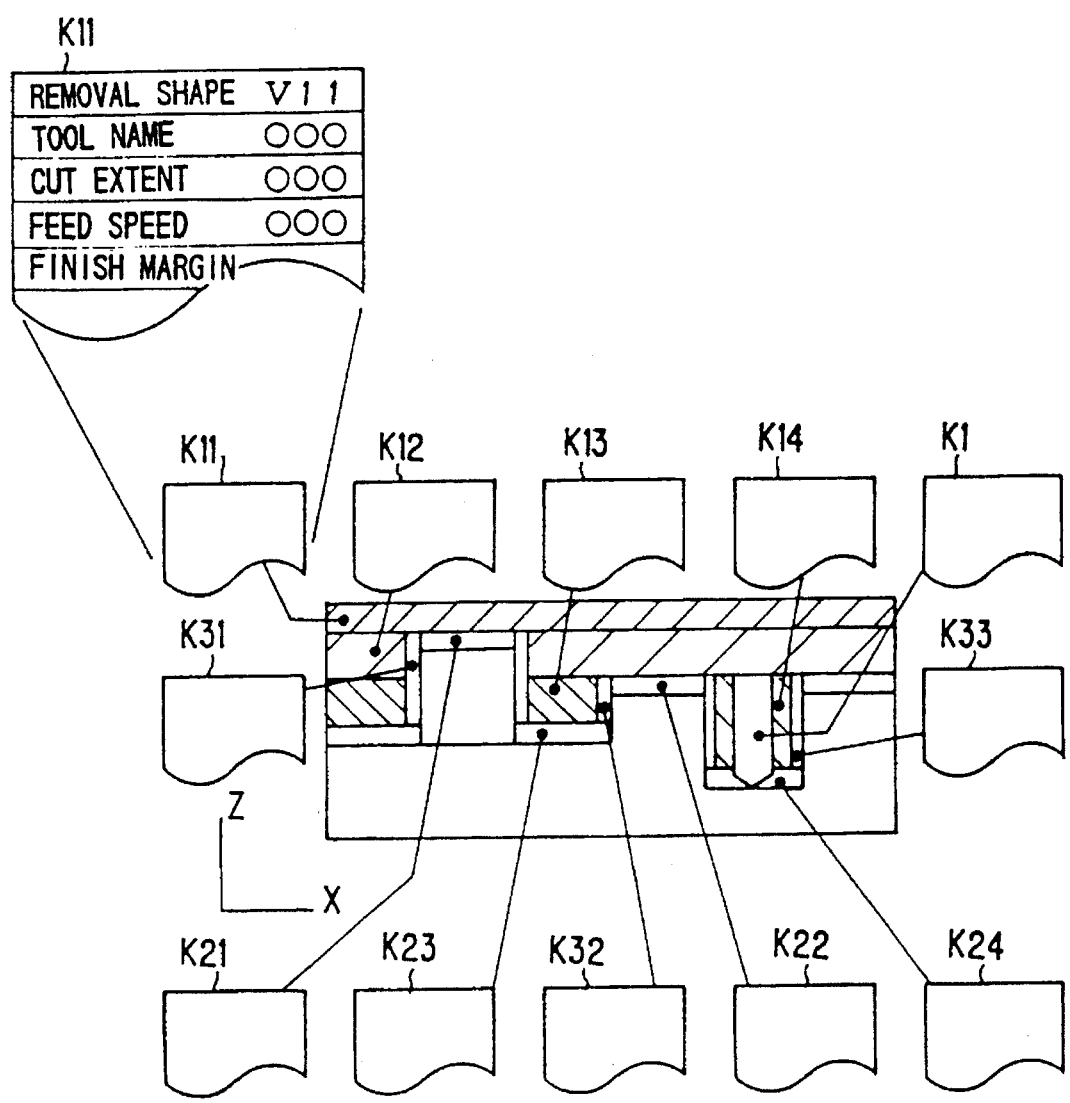
FIG. 21 is a view for explaining machining steps according to the invention.
Figure 23:
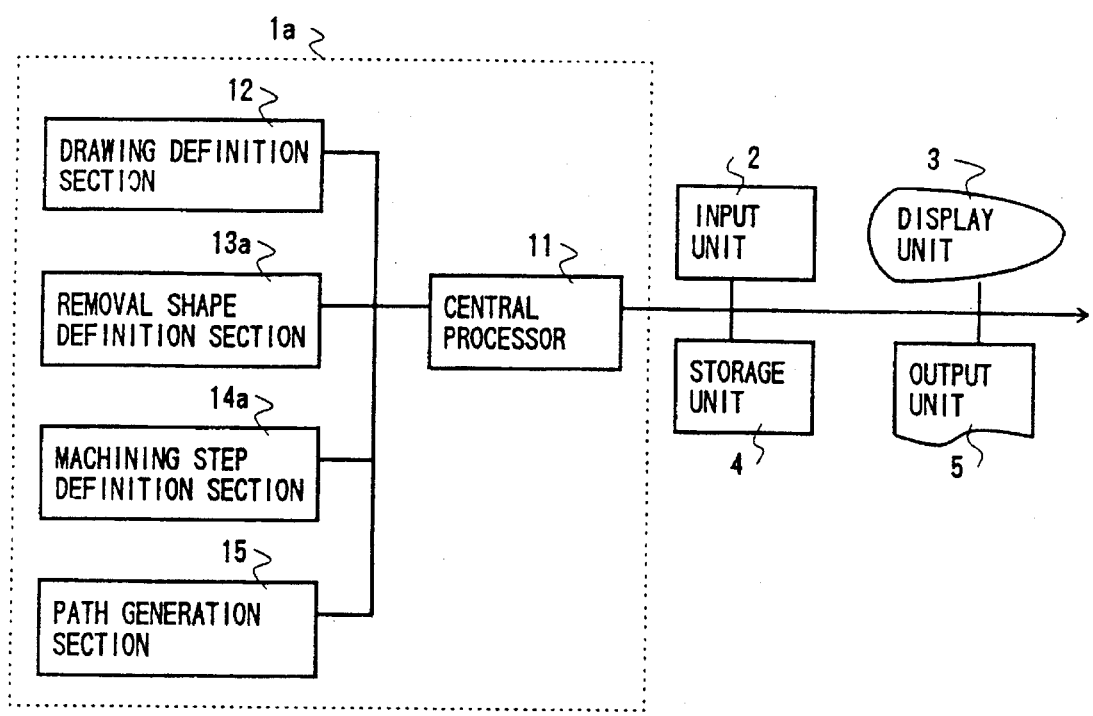
FIG. 23 is a block diagram outlining a conventional CAD/CAM system.
Figure 24:
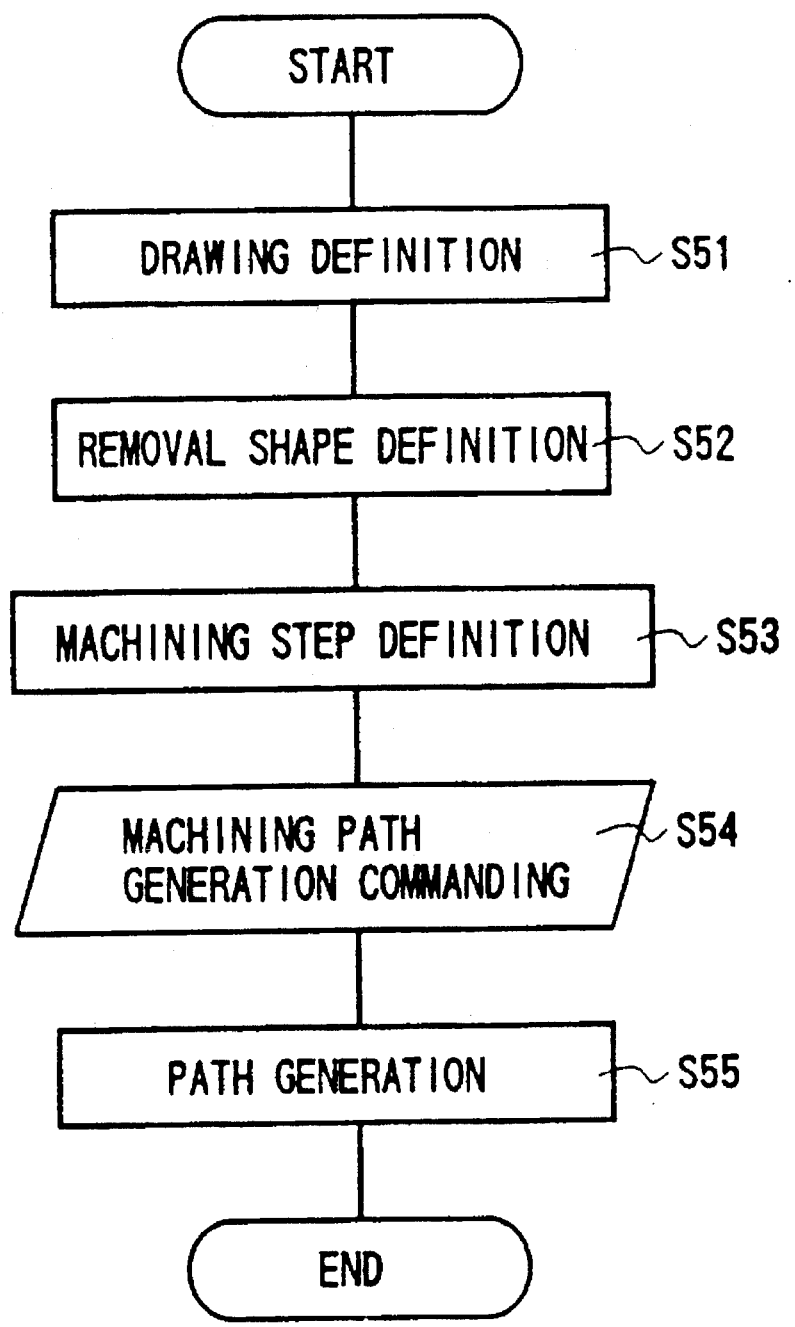
FIG. 24 is a flow chart showing the flow of operation in the conventional CAD/CAM system.

Further, according to the path generation commands noted above, the central processor 11 causes the machining step generation section 14 to divide the above removal shape stored in the storage unit such as to obtain removal shapes V11 to V14 as shown in FIGS. 15A–15H in coarse machining, those V21 to V24 as shown in FIGS. 16A–16H in bottom finish machining, those V31 to V33 as shown in FIGS. 17A–17F in side finish machining and that V1 as shown in FIGS. 18A and 18B of the removal shape V24 in initial hole formation. FIG. 21 shows machining steps K11 to K14, K22 to K24 and K31 to K33 which correspond to the respective removal shapes V11 to V14, V21 to V24 and V31 to V33. The central processor 11 causes the section 14 to store these machining steps in the storage unit 4. Further, for these steps it causes the section 14 to set such machining conditions as machining directions d11 to d13 as shown in FIGS. 10A–10D, machining directions d21 to d23 and radial cut extents Pr11 to Pr13 and Pr21 to Pr23 of tool as shown in FIGS. 11A–11D, Z direction cut extents Pz1 to Pz4 of tool as shown in FIG. 19, radial and Z direction feed speeds, rpm and protruding extent of tool, approach system, escape system, etc. and store these set data in the storage unit 4 (step S4: machining step generation of FIG. 5).

Further, according to the above path generation commands the central processor 11 causes the path generation section 15 to generate progressively paths P11 to P13 as shown in FIGS. 10A–10D for coarse machining, initial hole formation path P15, coarse machining path P14, bottom finish machining paths P21 to P24 and side finish machining paths P31 to P33 as shown in FIGS. 18A and 18B according to the machining steps K11 to K14, K21 to K24 and K31 to K33 shown in FIG. 21 and store these generated path data in the storage unit 4, thus bringing an end to the routine (step S5: path generation).

Figure 10A:
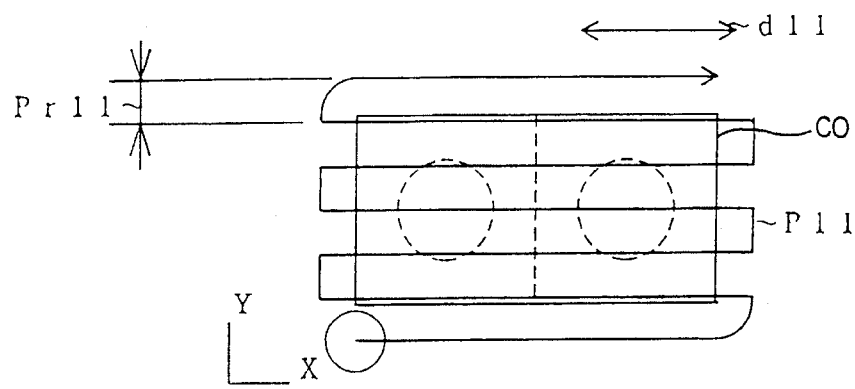
FIGS. 10A–10D show views for explaining the path generation according to the invention.
Figure 10B:
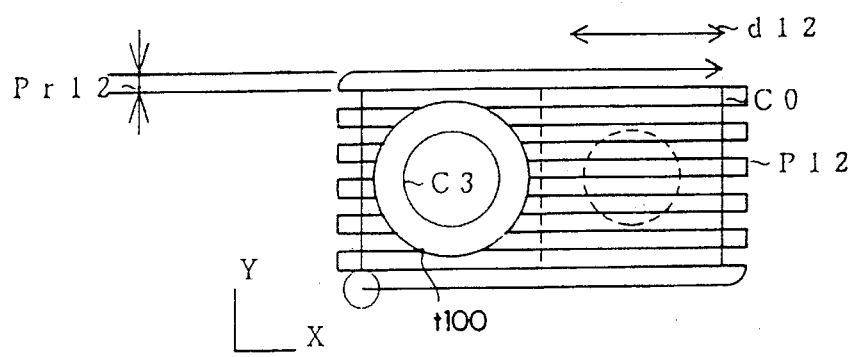
Figure 10C:
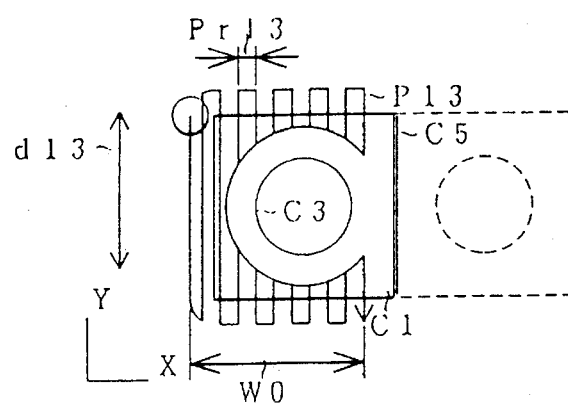
Figure 10D:
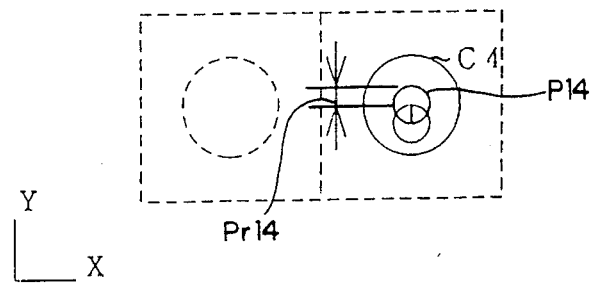

It should be noted that, when a path is formed evading the curve C3 like path 12 as shown in FIG. 10B, the path is formed so that the path once goes around the curve C3 to be evaded from a point t100 where the path contacts the curve C3 first, returns to the point t100, and goes further continuously along and evading the curve C3, and also so that, when the path contacts the curve C3 to be evaded twice or more, the path is formed along and evading the curve C3 so that said path will not contact the curve C3 anymore in the same turn.

The operation of the removal shape extraction section 13 embodies a second important feature. The Z direction division section 131 in the removal shape extraction section 13 rearranges the top and bottom heights Z0 and Z5 of the work shape V0 of FIG. 9B in the Z direction shown in FIG. 14A and the machining surface heights Z1 to Z4 of the finish shape V1 of FIG. 9A in the Z direction shown in FIG. 14B, stored in the storage unit 4. The rearranging is made in the order of greater heights. Then, the section 131 omits any machining surface height Z greater than the top height Z0 and that less than the bottom height Z5 and generates Z direction removal shape data by pairing the machining surface heights Z0 and Z1, Z1 ad Z2, Z2 and Z3, Z3 and Z4 and Z4 and Z5, the generated data being stored in the storage unit 4 (step S31: Z direction division of FIG. 7).

The contour curve inclusion judgment section 132 in the removal shape extraction section 13 extracts the curves C0 and C3 shown in FIG. 13B, found between the top and bottom heights Z0 and Z1, stored in the storage unit 4. Then, from the top height Z0, the machining surface height and the curves C0 and C3 as a set, it generates a removal shape Vz1 in the radial direction as shown in FIG. 14B and stores the generated data in the storage unit 4. Likewise, with the machining surface heights Z1 and Z2 and the curves C0 and C2 to C4, the machining surface heights Z2 and Z3 and the curves C0 to C4, and the machining surface heights Z3 and Z4 and the curves C0 to C4 as respective sets, the section 132 generates removal shapes Vz2 to Vz4 in the radial direction in FIG. 14B and stores the generated data in the storage unit 4, thus bringing an end to the routine (step S32: contour curve inclusion judgment for each removal shape of FIG. 7).

The operation of the machining step generation section 14 embodies a third important feature. The machining step division section 141 in the machining step generation section 14 generates a removal shape and a machining step from each radial direction removal shape for each of three divisional machining steps, i.e., a coarse, a bottom finish and a side finish machining step. Specifically, from a radial direction removal shape Vz1 the section 141 generates, for the coarse machining step, a removal shape V11 with the curves C0 and C3 shown in FIG. 15A as the outer and inner peripheral curves of the radial direction margin and with the machining surface height Z1 from the top height Z0 plus the finish margin Cz1 as the Z direction margin. For this machining step, it also generates a machining step K11 shown in FIG. 21. For the finish machining step, it generates a removal shape V21 with the curve C3 shown in FIG. 16A as the radial direction margin and with a Z direction margin from the machining surface height Z1 plus the finish margin Cz1 shown in FIG. 16A to the machining surface height Z1, and also generates a machining step K21. For the side finish machining step, it generates no machining step because there is no side to be machined between the top height Z0 and the machining surface height Z1. Likewise, from radial direction removal shapes Vz2 to Vz4 shown in FIG. 14B the section 141 generates removal shapes V12 to V14 shown in FIGS. 15A–15H, removal shapes V21 to V24 shown in FIGS. 16A–16H and removal shapes V31 to V33 shown in FIGS. 17A–17F and machining steps K11 to K13, K21 to K23 and K31 to K33 shown in FIG. 21. The generated removal shape data and machining step data are stored in the storage unit 4.

With the removal shapes V11 and V12 shown in FIGS. 15A–15D, the outer periphery curve is the curve C0 shown in FIG. 13B, representing the contour of the work shape. Thus, for the removal shape V11 the machining direction is determined to be longitudinal directions d11 in FIG. 10A, and for the removal shape V12 it is determined to be longitudinal directions d12. With the removal shapes V21 and V22, island-like characteristic data is added to the curves C3 and C2 representing the contour of the finish shape outer periphery curves. Thus, for the removal shape V21 the machining direction is determined to be longitudinal directions d21 shown in FIG. 11A, and for the removal shape V22 it is determined to be longitudinal directions d22 shown in FIG. 11B. With the removal shapes V13 and V23, the adjacent outer periphery curves C3 and C4 are of opposite shape characters providing pond- and island-like characteristic data, respectively. Thus, for these removal shapes the curve C5 as adjacent portions of the curves C3 and C4 is extracted, and the machining directions are determined to be along the curve C5. (step S41: machining direction determination of FIG. 8).

The offset direction determination section 143 in the machining step generation section 14 determines the offset direction with respect to the removal shape contour curves.

The contour curve C0 of the removal shapes V11 and V12, the contour curve C3 of the removal shape V21 and the contour curve C2 of the removal shape V22 are island-like. Thus, the section 143 determines the offset direction with respect to the curves C0, C3 and C3 to be directed outward.

With respect to the contour curve C4 of the removal shapes V14 and V24, which is pond-like, it determines the offset direction to be directed inward. With respect to the contour curves C1 and C5 of the removal shapes V13 and V23, which have island-like with wall, the section 143 determines the offset direction with respect to the pond-like curve C5 to a direction, in which there is an intersection point between a curve obtained by offsetting the curve C5 and the curve C1, and with respect to the island-like curve C1 it determines the offset direction to be a direction, in which there is no intersection point between a curve obtained by offsetting the curve C1 and the curve C5 (step S42: machining condition determination of FIG. 8).

The machining condition determination section 145 in the machining step generation section 14 determines path patterns with respect to the removal shape contour curves.

Figure 15A:
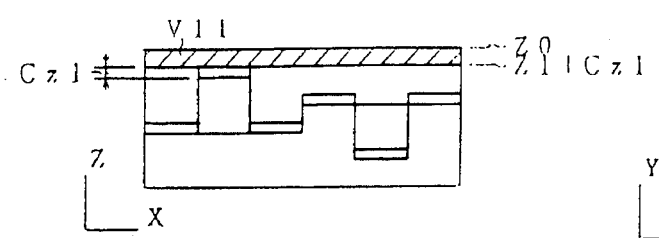
FIGS. 15A–15H show views for explaining removal shape as a subject of the path generation according to the invention.
Figure 15B:
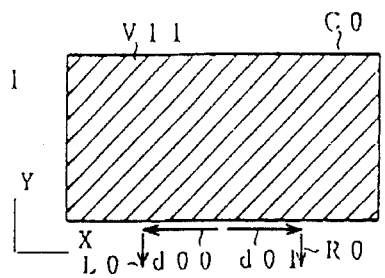
Figure 15C:
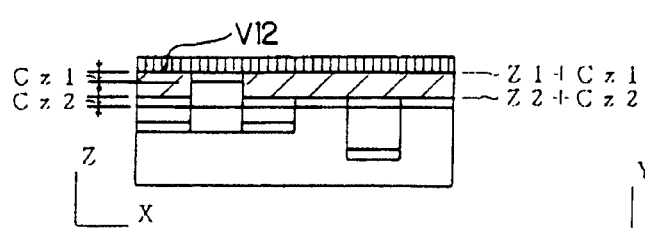
Figure 15D:
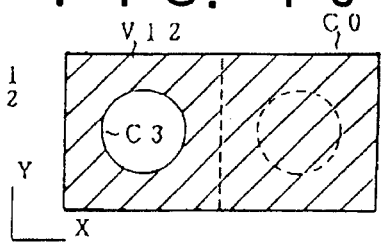
Figure 15E:
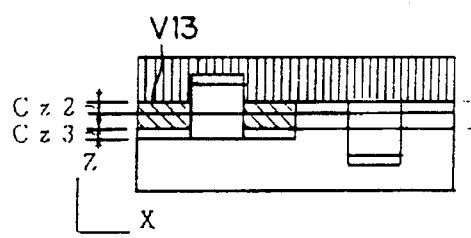
Figure 15F:
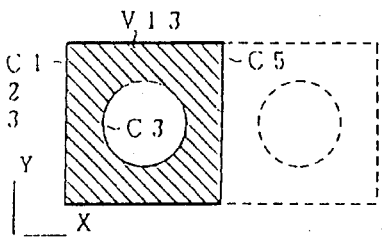

In FIGS. 15B and 15D, the curve C0 representing the contour of the removal shapes V11 and V12, the curve C3 representing the contour of the removal shapes V21 and the curve C2 representing the contour of the removal shape V22, are island-like. For these contour curves, the section 145 determines the path pattern to consist of parallel lines. With respect to the curve C4 representing the contour of the removal shapes V14 and V24, which is pond-like, the section 145 determines the path pattern to be helical. With respect to the curves C1 and C5 representing the contours of the removal shapes V13 and V23, which have island-like with Wall, the section determines the path pattern to be one which continuously offsets the pond-like curve C5 (step S42: machining condition determination in FIG. 8).

Figure 20A:
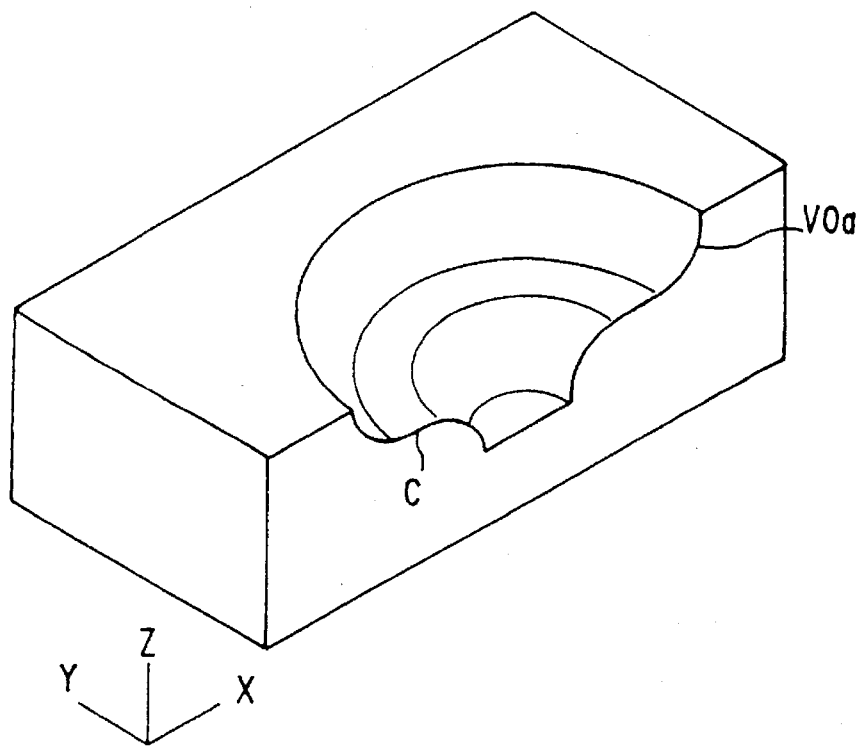
FIGS. 20A–20B show views for explaining curved shape and horizontal portion according to the invention.
Figure 20B:
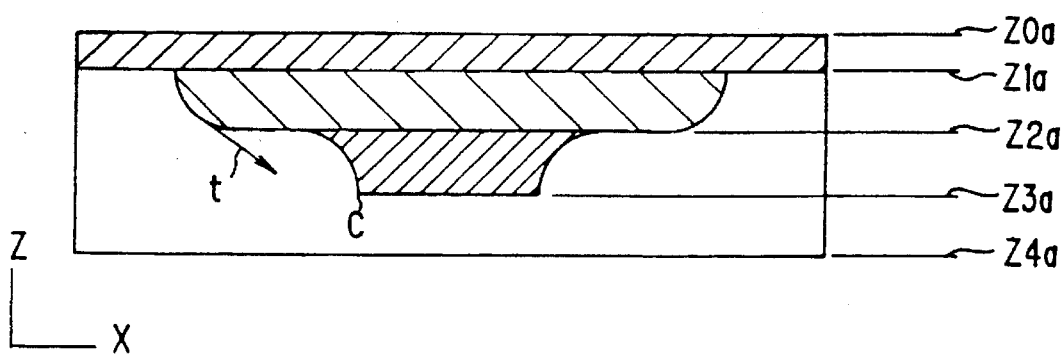

The operation of the Z direction division section 131 in the removal shape extraction section 13 embodies a fourth important feature. In case where the finish shape V0a shown in FIG. 20A is a curved shape, the section 131 causes calculation of a tangent vector to drawing element constituting the curve C representing a section of the finish shape V0a. Then, it divides the removal shape in the Z height direction at a height Z2a, at which the tangent vector is parallel to a horizontal plane.

The operation of the machining direction determination section 142 in the machining step generation section 14 embodies a fifth important feature. With the removal shapes V11 and V12 shown in FIGS. 15A–15D, the outer periphery curve is the curve C0 representing the contour of the work shape. Also, the work shape V0 shown in FIG. 9B is island-like. With the curve C0, the width in the X direction is greater than the width in the Y direction. Thus, the machining direction determination section 142 determines the machining direction with respect to the removal shape V11 to be longitudinal directions d11 in the X direction and with respect to the removal shape V12 to be longitudinal directions d12 in the X direction. With the removal shapes V21 and V22 shown in FIGS. 16A–16D, island-like-characteristic data is added to the curves C3 and C2 representing the outer periphery curve finish shape contours. Thus, like the curve C0 the section 142 determines the machining direction to be longitudinal directions d12 with respect to the removal shape V21 and longitudinal directions d22 with respect to the removal shape V22. With the removal shapes V13 in FIGS. 15A–15F and V23 in FIGS. 16E and 16F, opposite characters, that is, pond- and island-like characteristic data, are added to the adjacent outer periphery curves C3 and C4. Thus, the section 142 successively connects coincident drawing elements among those constituting the curves C3 and C4 to generate the curve C5 in FIG. 15F as adjacent portions of curves. In this way, it determines the machining directions d13 and d23 with respect to the removal shapes V13 and V23 to be along the curve C5 (step S41: machining direction determination in FIG. 8).

The operation of offset direction determination section 143 in the machining step generation section 14 embodies a sixth important feature. The curve C0 representing the contour of the removal shapes V11 and V12 shown in FIGS. 15A– 15D, represents the contour of the work shape V0. Thus, the section 143 judges the curve to be island-like. The curves C3 and C2 shown in FIGS. 16A–16D, representing the contours of the removal shapes V21 and V22, has added island-like characteristic data. Thus, if the direction of rotation of the curve C0 is to the right, the section 143 determines the offset direction for the curve C0 to be leftward direction L0 with respect to the direction d00 of tracing the curve C0 in the direction of rotation. If the direction of rotation of the curve C0 is to the left, on the other hand, the section 143 determines the offset direction to be rightward or outward direction R0 with respect to the direction d01 of tracing the curve C0 in the direction of rotation. Like the curves C0, the curves C3 and C2 are offset outward.

Figure 15G:
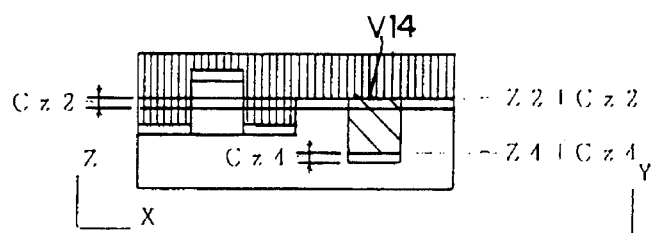
Figure 15H:
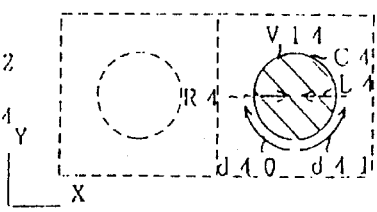
Figure 16A:
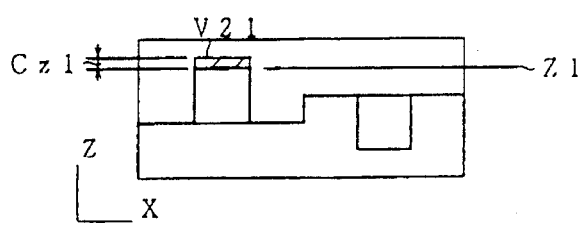
FIGS. 16A–16H show views for explaining removal shape as a subject of the path generation according to the invention.
Figure 16B:
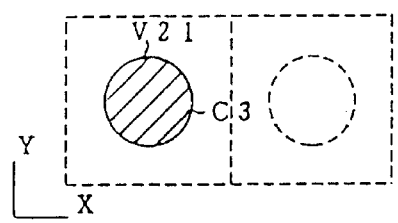
Figure 16C:
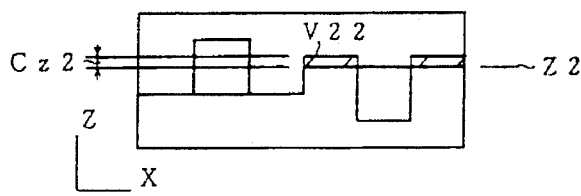
Figure 16D:
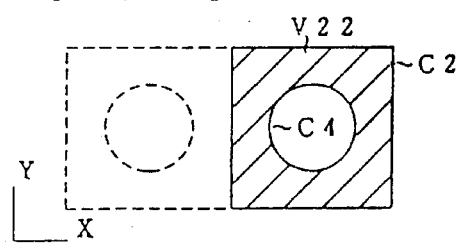
Figure 16E:
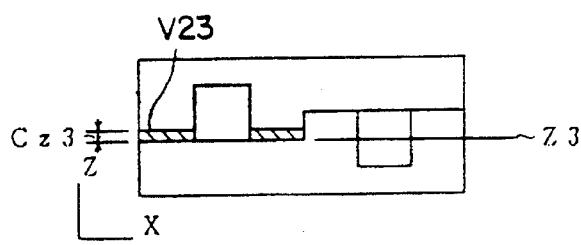
Figure 16F:
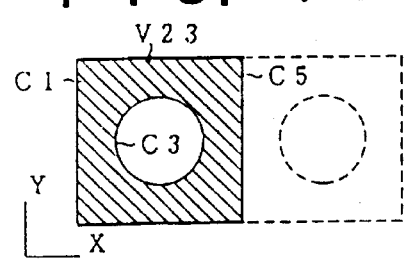
Figure 16G:
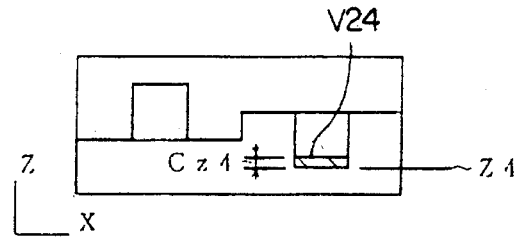
Figure 16H:
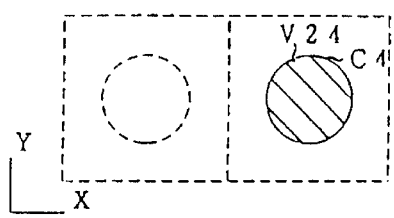
Figure 17A:
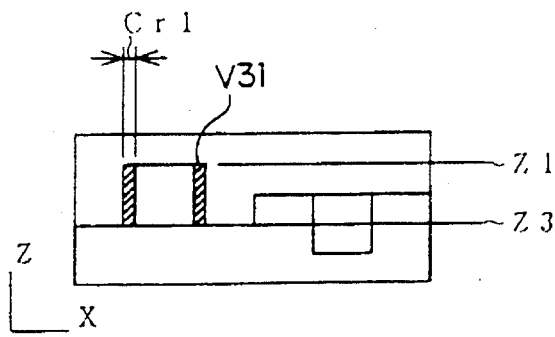
FIGS. 17A–17F show views for explaining shape removal as a subject of the path generation according to the invention.
Figure 17B:
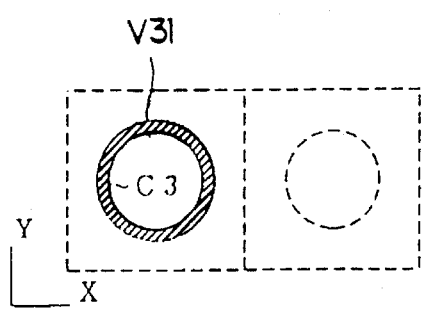
Figure 17C:
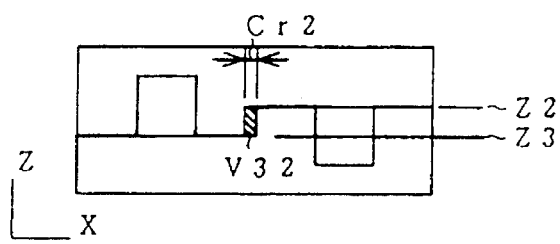
Figure 17D:
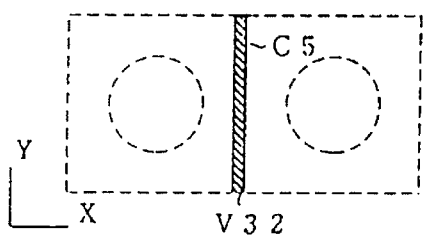
Figure 17E:
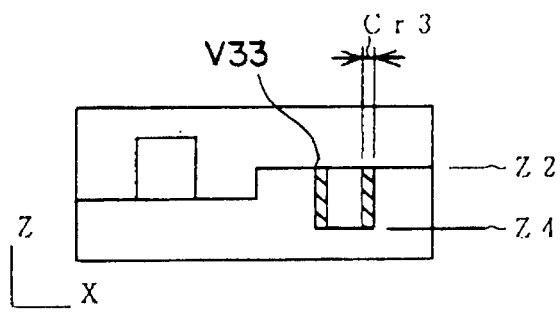
Figure 17F:
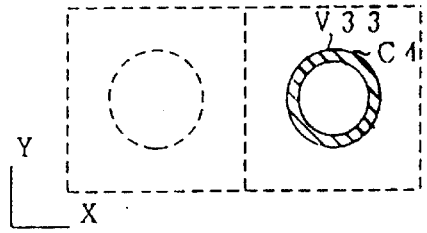

With the curve C4 representing the contour of the removal shapes V14 in FIGS. 15G and 15H and V24 in FIGS. 16G and 16H, the section 143 determines the offset direction to be rightward direction R4 with respect to the direction d40 tracing the curve C4 in the rotational direction thereof if the rotation is to the right and to be leftward or inward direction L4 with respect to the direction d41 of tracing the curve C4 in the direction of rotation if the rotation is to the left. The curve C1 representing the contour of the removal shapes V13 in FIG. 15F and V23 in FIG. 16F has added pond-like-characteristic data, while the curve C5 has added pond-like-characteristic data. Thus, the section 143 determines the offset direction for the curve C5 to be directions d5, in which there is an intersection point between a curve obtained by offsetting the curve 5 and the curve Cl, while determining the offset direction for the island-like curve C1 to be outward like the curve C0 (step S42: machining condition determination in FIG. 8).

The operation of the offset amount determination section 144 in the machining step generation section 14 embodies a seventh important feature. The curve C0 representing the contour of the removal shapes V11 and V12, shown in FIGS. 15A– 15D, represents the contour of the work shape V0 and is judged to be island-like. The curves C3 and C2 representing the contours of the removal shapes V21 and V22, shown in FIGS. 16A–16D, have added island-like characteristic data. With respect to these curves C0, C3 and C2, the section 144 determines the offset amounts as the differences between the protrusion extents of the tool and the tool diameter. With respect to the curve C4 representing the contour of the removal shapes V14 in FIGS. 15G and 15H and V24 in FIGS. 16G and 16F has added pond-like characteristic data, the section 144 determines the offset amount as the sum of the tool diameter and the radial direction finish margin. With the curve C1 representing the contour of the removal shapes V13 in FIGS. 15E and 15F and V23 in FIGS. 16E and 16F, island-like characteristic data is added, while with the curve C5 pond-like characteristic data is added. Thus, the section 144 determines the offset amount with respect to the curve C5 as the sum of the tool diameter and the finish margin and with respect to the curve C1 as the difference between the tool protrusion extent and the tool diameter (step S42: machining condition determination in FIG. 8).

The operation of the machining condition determination section 145 in the machining step generation section 14 embodies an eighth important feature. The curve C0 representing the contour of the removal shapes V11 and V12, shown in FIGS. 15A– 15D, is of the work shape judged to be island-like, and the curves C3 and C2 representing the contours of the removal shapes V21 and V22 shown in FIGS. 15A–15D and 16A–16D, respectively, have added island-like characteristic data. Thus, the section 145 determines the path pattern of these curves to consist of parallel lines like the path P22 shown in FIG. 11B. With the curves C4 representing the contour of the removal shapes V14 and V24, which has added pond-like characteristic data, the section 145 determines the path pattern to be helical like the path P24 in FIG. 11D. The curve C1 representing the contour of the removal shapes V13 and V23 shown in FIGS. 15E and 15F and FIGS. 16E and 16F has added island-like characteristic data, while the curve C5 has added pond-like characteristic data. Thus, the section 145 determines the path pattern in this case to be a pattern obtainable by continuously offsetting the pond-like curve C5 (step S42: machining condition determination in FIG. 8).

The operation of the machining condition determination section 144 in the machining step generation section 14 embodies a ninth important feature. First, the section 144 stores the machining steps K11 to K14 for coarse machining as shown in FIG. 21 and the Z direction tool cut extents Pz1 to Pz4 as shown in FIG. 19 in the storage unit 4. The section 144 then uniformizes the tool cut extent Pz4. This is done in such a manner that in connection with the removal shape V14 shown in FIGS. 15G and 15H in the coarse machining step K14, the top height Z2 plus the finish margin Cz2 minus the bottom height Z4 minus the finish margin Cz1 is divided by the tool cut extent Pz4. Denoting the quotient of the division by D and the remainder by L, if L is zero, no particular process is executed. If L is not zero, with respect to the removal shape V11 in the coarse machining step K11, the top height Z0 minus the bottom height Z1 plug the finish margin Cz1 is divided by D+1, and the result of the calculation is substituted for the tool cut extent Pz2, thus effecting the uniformization. Like the tool cut extent Pz4, the tool cut extents Pz1 to Pz3 are also uniformized.

Figure 11A:
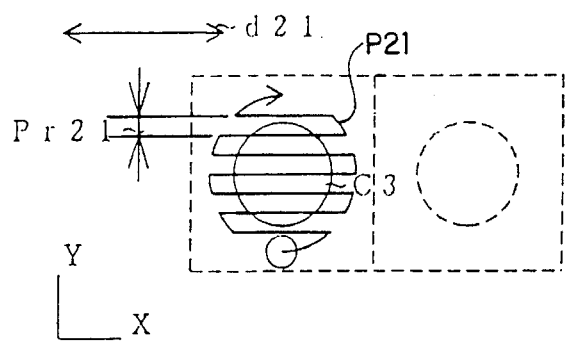
FIGS. 11A–11D show views for explaining the path generation according to the invention.
Figure 11B:
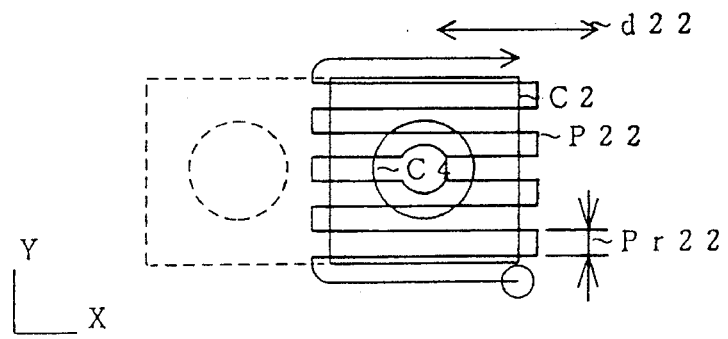
Figure 11C:
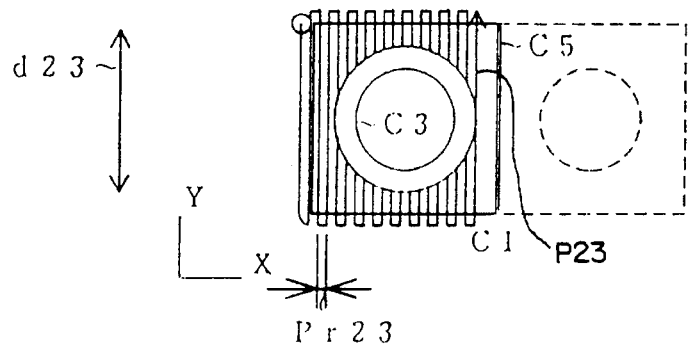
Figure 11D:
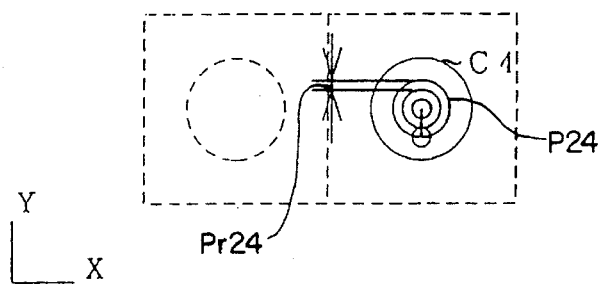
Figure 12A:
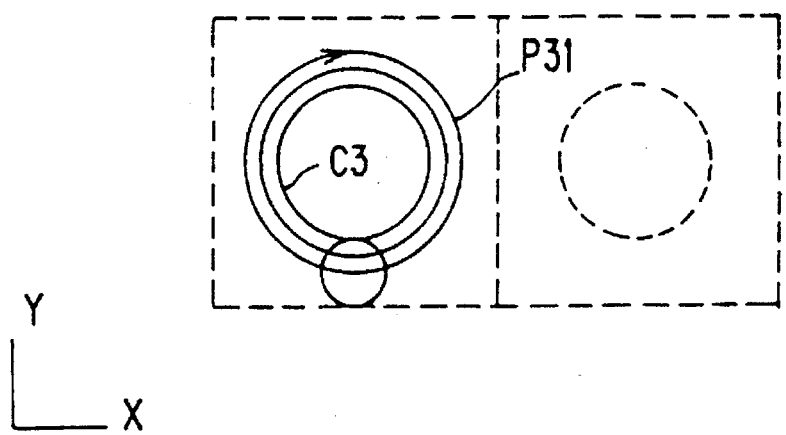
FIGS. 12A–12C show views for explaining the path generation according to the invention.
Figure 12B:
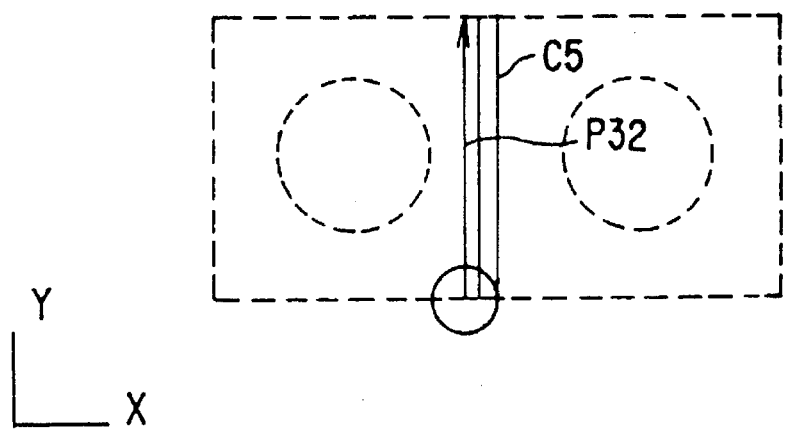
Figure 12C:
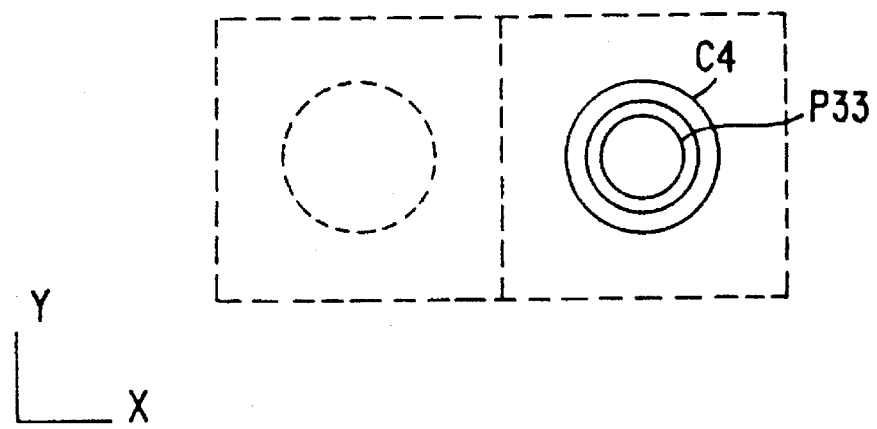

The machining condition determination section 144 then stores the radial direction tool cut extents Pr11 and Pr 12 shown in FIGS. 10A and 10B and Pr21 and Pr22 shown in FIGS. 11A and 11B in the machining steps K11, K12, K21 and K22 with parallel line machining path pattern in the storage unit 4. The section 144 then effects uniformization of the radial direction tool cut extent Pr11. This is done in a manner that with respect to a curve obtained by outwardly offsetting the curve C0 representing the removal shape V11 shown in FIGS. 15A–15D by an offset amount corresponding to the difference between the tool protruding extent and the tool diameter, the width W0 in a direction perpendicular to the machining directions d11 shown in FIG. 10A is divided by the radial direction tool cut extent Pr11. Denoting the quotient of the division by D2 and the remainder by L2, if L2 is zero, no particular process is executed. If L2 is not zero, with respect to a curve obtained by outwardly offsetting the curve C0 by an offset amount corresponding to the difference between the tool protruding extent and the tool diameter, the width in the direction perpendicular to the machining directions d12 is divided by D2+1, and the result of the division is substituted for the radial direction tool cut extent Pr11, thus effecting the uniformization. Like the radial direction tool cut extent Pr11, the section 144 also uniformizes the radial direction tool cut extents Pr12, Pr21 and Pr22.

The operation of the machining condition determination section 144 in the machining step generation section 14 embodies a tenth important feature. The CAD/CAM system described previously has an optimum machining condition data base registered for each tool. The section 144 calls out machining conditions such as radial and Z direction cut extents, radial and Z direction feed speeds rom of the tool corresponding to various input tool specification data such as shape and number of cutter blades from the optimum machining condition data base noted above according to input tool name or tool identification NO. and sets the machining steps K11 to K13, K1, K14, K21 to K24 and K31 to K33 in the storage unit 4.

The operation of the initial hole determination section 146 in the machining step generation section 14 embodies an eleventh important feature. The curve C0 representing the contour of the removal shapes V11 and V12 shown in FIGS. 15A–15D in the machining steps K11 and K12 shown in FIG. 21 represents the contour of the work shape. In this case, the section 146 judges the removal shapes V11 and V12 to be island-like and generates no initial hole machining step. The curves C3 and C3 representing the contours of the removal shapes V21 and V22 shown in FIGS. 16A–16D in the machining steps K21 and K22 shown in FIG. 21 have added island-like characteristic data. In this case, the section 146 thus generates no initial hole machining step. The curve C4 representing the contour of the removal shapes V14 in FIGS. 15A and 15B and V24 in FIGS. 16G and 16H in the machining steps K14 and K24 shown in FIG. 21 has added pond-like characteristic data. In this case, the section 146 generates the initial hole machining step K1 before the coarse machining step K14.

Further, the section 146 starts- the path generation section 15 to obtain the X, Y and Z coordinates of the path start position in the coarse machining step K14 and then stops the process in the path generation section 15 before the path generation. Thus, it obtains the start position noted above as the initial hole machining start position. The section 146 generates the initial hole removal shape I1 with the start position noted above and the Z direction top height Z2 plus Cz2 and the bottom height Z4 plus Cz4 of the removal shape V14 shown in FIGS. 15G and 15H in the coarse machining step K14 as data of the removal shape I1. The curve C1 representing the contour of the removal shapes V13 and V23 in FIGS. 15C and 15F and 16E and 16F respectively in the machining step in FIG. 21 has added pond-like characteristic data, and the curve C5 shown in FIG. 15F has added island-like characteristic data. Thus, the section 146 judges the removal shapes V13 and V23 to have island-like with wall and generates no initial hole machining step (step S43: initial hole determination in FIG. 8).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A CAD/CAM system for automatically generating data for machining a workpiece into a finished shape, including the generation of plural machining paths according to predefined finish shape data and workpiece shape data, said data for machining the workpiece being expressed in a coordinate system having an X-axis and a Y-axis lying in a horizontal plane and having a Z-axis extending in a vertical direction, the system comprising:

a removal shape extraction means for determining removal shape data from said predefined finish shape data and workpiece shape data, said removal shape extraction means comprising: Z direction division means for dividing the workpiece shape at points along the Z-axis corresponding to each machining surface Z height of the finished shape between upper and lower Z heights along the Z-axis; and contour curve inclusion judgment means for specifying a removal shape for each machining surface Z height by judging whether a finish shape contour curve is included in the removal shape, wherein the Z direction division means includes an extraction division means for extracting, in the case of a curved finish shape, an X-Y plane portion representing a section of the pertinent removal shape; and a machining step generation means for generating a machining step, corresponding to a machining surface of each removal shape extracted by said removal shape extraction means, for each of plural Z heights of the workpiece.

2. A CAD/CAM system according to claim 1, further comprising path generation means for generating machining paths in response to said machining step generation means.

3. A CAD/CAM system according to claim 1, wherein said machining step generation means comprises:

a machining direction determining means for automatically determining a machining direction by effecting removal shape division for each of coarse and finish machining steps, machining condition determining means for automatically determining machining conditions comprising at least one of cut extents, feed speeds and rpm of tool for each machining step, offset direction determining means for automatically determining corresponding finish shape contour curve offset direction for each said machining step, offset amount determining means for automatically determining a contour curve offset amount for each said machining step, and initial hole determining means for automatically determining the position of an initial hole for machining.

4. A CAD/CAM system according to claim 3, wherein said machining direction determining means includes determining means for automatically effecting the machining path direction determination such that if the finish shape contour corresponding to a machining step is pond-like, the machining path direction is along the finish shape contour, if said contour is island-like, the direction is parallel to the longitudinal direction of said contour, and if said contour has pond- and island-like portions, the direction is along the island-like portion of said contour.

5. A CAD/CAM system according to claim 3, wherein said offset direction determining means includes determining means for automatically determining the offset direction such that if the finish shape contour corresponding to the work shape after the division is pond-like, the offset direction of said contour is directed inwardly of said contour, if said contour is island-like, the offset direction is directed outwardly of said contour, and if said contour has pond- and island-like portions, the offset is directed inwardly of said contour with respect to said pond-like portion and outwardly of said contour with respect to said island-like portion.

6. A CAD/CAM system according to claim 3, wherein said offset amount determining means includes determining means for automatically determining the amount of tool diameter offsetting of the finish shape contour for a machining step such that if said contour is pond-like, the offset amount is the sum of the tool diameter and the finish margin, if said contour is island-like, the offset amount is the difference between the tool diameter and an extent of protruding of the tool, and if said contour has pond- and island-like portions, the offset amount is the sum of the tool diameter and the finish margin with respect to said pond-like portion while the difference between the tool diameter and the amount of protruding of the tool with respect to said island-like portion.

7. A CAD/CAM system according to claim 3, wherein said machining condition determining means automatically determines the machining path pattern such that if the finish shape contour corresponding to the machining path is pond-like, the machining path pattern is helical, if said contour is island-like, the pattern consists of parallel lines, and if contour has pond- and island-like portions, the pattern continuously offsets the island-like portion of said contour.

8. A CAD/CAM system according to claim 3, wherein said machining condition determining means includes first uniformizing means for uniformizing the Z direction cut extent in each machining step, and second uniformizing means for uniformizing the radial direction cut extent in each machining step.

9. A CAD/CAM system according to claim 3, wherein said machining condition determining means includes setting means for calling machining conditions, comprising at least one of radial and Z direction cut extents, radial and Z direction feed speeds and rpm of tool, from an optimum machining condition data base registered for each tool according to the input tool name or tool identification number and setting the called machining conditions for the pertinent machining step.

10. A CAD/CAM system according to claim 3, wherein said initial hole determining means includes control means for automatically generating an initial hole machining step if the finish shape contour corresponding to the machining step is pond-like and not generating any initial hole machining step if said contour has pond- and island-like portions.

11. A method for use in a CAD/CAM system for automatically generating data for machining a workpiece into a finished shape, including the generation of plural machining paths according to predefined finish shape data and workpiece shape data, said data being expressed in a coordinate system having an X-axis and a Y-axis lying in a horizontal plane and having a Z-axis extending in a vertical direction, the method comprising the steps of:

determining removal shape data from said predefined finish shape data and workpiece shape data, said step of determining removal shape data comprising the steps of: dividing the workpiece shape at points along the Z-axis corresponding to each machining surface Z height of the finished shape between upper and lower Z heights along the Z-axis; and specifying a removal shape for each machining surface Z height by judging whether a finish shape contour curve is included in the removal shape, wherein the Z direction division step includes extracting, in the case of a curved finish shape, an X-Y plane portion representing a section of the pertinent removal shape; and generating a machining step, corresponding to a machining surface of each removal shape extracted by said removal shape extraction means, for each of plural Z heights of the workpiece.

12. A CAD/CAM system method according to claim 11, further comprising defining two dimensional drawings of the work shape and providing related data for said determining step, and generating machining paths in response to said machining step generating step.

13. A CAD/CAM system method according to claim 12, wherein said drawing defining step comprises defining a two dimensional drawing of the finished shape as a plurality of lines, extracting curves from said plurality of lines and defining and storing a work shape.

14. A CAD/CAM system method according to claim 11, wherein said machining step generating step comprises:

automatically determining a machining direction by effecting removal shape division for each of coarse and finish machining steps, automatically determining machining conditions comprising at least one of cut extents, feed speeds and rpm of tool for each machining step, automatically determining corresponding finish shape contour curve offset direction for each said machining step, automatically determining a contour curve offset amount for each said machining step, and automatically determining the position of an initial hole for machining.

15. A CAD/CAM system method according to claim 14, wherein said machining direction determining step comprises automatically effecting the machining path direction determination such that if the finish shape contour corresponding to a machining step is pond-like, the machining path direction is along the finish shape contour, if said contour is island-like, the direction is parallel to the longitudinal direction of said contour, and if said contour has pond- and island-like portions, the direction is along the island-like portion of said contour.

16. A CAD/CAM system method according to claim 14, wherein said offset direction determining step includes automatically determining the offset direction such that if the finish shape contour corresponding to the work shape after the division is pond-like, the offset direction of said contour is directed inwardly of said contour, if said contour is island-like, the offset direction is directed outwardly of said contour, and if said contour has pond- and island-like portions, the offset is directed inwardly of said contour with respect to said pond-like portion and outwardly of said contour with respect to said island-like portion.

17. A CAD/CAM system method according to claim 14, wherein said offset amount determining step further comprises automatically determining the amount of tool diameter offsetting of the finish shape contour for a machining step such that if said contour is pond-like, the offset amount is the sum of the tool diameter and the finish margin, if said contour is island-like, the offset amount is the difference between the tool diameter and an extent of protruding of the tool, and if said contour has pond- and island-like portions, the offset amount is the sum of the tool diameter and the finish margin with respect to said pond-like portion while the difference between the tool diameter and the amount of protruding of the tool with respect to said island-like portion.

18. A CAD/CAM system method according to claim 14, wherein said machining condition determining step comprises automatically determining the machining path pattern such that if the finish shape contour corresponding to the machining path is pond-like, the machining path pattern is helical, if said contour is island-like, the pattern consists of parallel lines, and if contour has pond- and island-like portions, the pattern continuously offsets the island-like portion of said contour.

19. A CAD/CAM system method according to claim 14, wherein said machining condition determining step comprises uniformizing the Z direction cut extent in each machining step, and uniformizing the radial direction cut extent in each machining step.

20. A CAD/CAM system method according to claim 14, wherein said machining condition determining step further comprises calling machining conditions, comprising at least one of radial and Z direction cut extents, radial and Z direction feed speeds and rpm of tool, from an optimum machining condition data base registered for each tool according to the input tool name or tool identification number and setting the called machining conditions for the pertinent machining step.

21. A CAD/CAM system method according to claim 14, wherein said initial hole determining step comprises automatically generating an initial hole machining step if the finish shape contour corresponding to the machining step is pond-like and not generating any initial hole machining step if said contour has pond- and island-like portions.

* * * * *